US011813915B2

(12) United States Patent
Zhao et al.

(10) Patent No.: US 11,813,915 B2
(45) Date of Patent: Nov. 14, 2023

(54) ACTIVE SUSPENSION INERTIA REGULATION METHOD BASED ON VEHICLE-FRONT TERRAIN, AND CONTROL SYSTEM

(71) Applicant: Yanshan University, Qinhuangdao (CN)

(72) Inventors: Dingxuan Zhao, Qinhuangdao (CN); Tao Ni, Qinhuangdao (CN); Mingde Gong, Qinhuangdao (CN); Shuang Liu, Qinhuangdao (CN); Zhuxin Zhang, Qinhuangdao (CN); Zhiguo Sun, Qinhuangdao (CN)

(73) Assignee: Yanshan University, Qinhuangdao (CN)

( * ) Notice: Subject to any disclaimer, the term of this patent is extended or adjusted under 35 U.S.C. 154(b) by 0 days.

(21) Appl. No.: 18/320,228

(22) Filed: May 19, 2023

(65) Prior Publication Data
US 2023/0286347 A1    Sep. 14, 2023

Related U.S. Application Data

(63) Continuation of application No. PCT/CN2022/085565, filed on Apr. 7, 2022.

(30) Foreign Application Priority Data

Jun. 26, 2021   (CN) .......................... 202110714689.4

(51) Int. Cl.
*B60G 17/0165* (2006.01)
*B60G 17/018* (2006.01)

(52) U.S. Cl.
CPC ....... *B60G 17/018* (2013.01); *B60G 17/0165* (2013.01); *B60G 2600/09* (2013.01);
(Continued)

(58) Field of Classification Search
CPC .............. B60G 17/018; B60G 17/0165; B60G 2600/09; B60G 2600/17; B60G 2600/182; B60G 2600/70; B60G 2800/915
See application file for complete search history.

(56) References Cited

U.S. PATENT DOCUMENTS

| 7,350,787 B2 | 4/2008 | Voss |
| 7,444,210 B2 | 10/2008 | Breed et al. |

(Continued)

FOREIGN PATENT DOCUMENTS

| CN | 2707546 Y | 7/2005 |
| CN | 203902200 U | 10/2014 |

(Continued)

*Primary Examiner* — Toan C To
(74) *Attorney, Agent, or Firm* — True Shepherd LLC; Andrew C. Cheng

(57) ABSTRACT

Disclosed in the present invention are an inertial regulation method of active suspensions based on terrain ahead of a vehicle and a control system thereof. According to the scanned terrain ahead of the vehicle, a center of mass trajectory and attitude history are calculated when the vehicle passes through the terrain ahead of the vehicle with passive suspensions. After smoothing the trajectory, the active suspension is controlled to make the vehicle drives according to the smoothed trajectory. During this period, a smoothness coefficient is adjusted to make each suspension stroke be limited within a limit stroke, and according to the supporting force and stroke of each active suspension calculated from a dynamics model, the impedance control based on force-displacement is carried out on an actuator of the suspension. The present invention can significantly improve the driving comfort and handling stability of the vehicle driving on an uneven road surface.

12 Claims, 5 Drawing Sheets

(52) U.S. Cl.
CPC .... *B60G 2600/17* (2013.01); *B60G 2600/182* (2013.01); *B60G 2600/1873* (2013.01); *B60G 2600/70* (2013.01); *B60G 2800/915* (2013.01)

(56) References Cited

U.S. PATENT DOCUMENTS

| | | | |
|---|---|---|---|
| 10,486,485 B1* | 11/2019 | Levinson | B60G 17/0162 |
| 11,286,013 B2 | 3/2022 | Sauvageau et al. | |
| 2007/0017727 A1* | 1/2007 | Messih | B60W 40/13 180/282 |
| 2018/0188744 A1* | 7/2018 | Switkes | G05D 1/0088 |
| 2020/0317018 A1* | 10/2020 | Nong | B60G 17/01908 |
| 2022/0379893 A1* | 12/2022 | Li | B60W 30/18163 |

FOREIGN PATENT DOCUMENTS

| | | | | |
|---|---|---|---|---|
| CN | 108189637 A | 6/2018 | | |
| CN | 110281727 A | 9/2019 | | |
| CN | 110789288 A | 2/2020 | | |
| CN | 110877509 A | 3/2020 | | |
| CN | 111169247 A | 5/2020 | | |
| CN | 113370734 A | 9/2021 | | |
| JP | H02169316 A | 6/1990 | | |
| WO | WO-2020043198 A1 * | 3/2020 | | B60W 30/02 |

\* cited by examiner

ACTIVE SUSPENSION INERTIA REGULATION METHOD BASED ON VEHICLE-FRONT TERRAIN, AND CONTROL SYSTEM

CROSS-REFERENCE TO RELATED APPLICATIONS

This application is a continuation of International Patent Application No. PCT/CN2022/085565 with a filing date of Apr. 7, 2022, designating the United States, now pending, and further claims priority to Chinese Patent Application No. 202110714689.4 with a filing date of Jun. 26, 2021. The content of the aforementioned applications, including any intervening amendments thereto, are incorporated herein by reference.

FIELD OF TECHNOLOGY

The present invention relates to the field of vehicle suspensions, in particular to a control method and control system of active suspensions based on terrain ahead of a vehicle.

BACKGROUND OF THE PRESENT INVENTION

A suspension system is an important part of a vehicle chassis, and its performance directly determines the driving comfort and handling stability of a vehicle. Most traditional vehicles employ passive suspension, of which suspension parameters are designed according to specific road conditions. Once selected, it is difficult to change, and cannot change with the road conditions, speed of the vehicle, etc., thus limiting the further improvement of the driving performance of the vehicle.

Active suspension is computer-controlled suspension developed in recent ten years. The active suspension can automatically adjust the stiffness and damping of the suspension or control the expansion of the suspension according to changes in vehicle weight, road conditions (such as jolt and vibration), operating conditions (such as the speed of vehicle, driving/braking, steering), so as to meet the requirements of the driving comfort and handling stability of the vehicle.

The active suspension technology mainly comprises a control method and system of active suspension. The active suspension system comprises a device that provides energy and an additional device that can control the force or displacement. According to the different ways of energy supply, it has hydraulic drive, pneumatic drive and electric drive. The hydraulic drive suspension system is widely used because of its high power density, convenient layout and installation. The pneumatic drive suspension system has also been used to a certain extent because of its advantages such as soft driving and little pollution. Even for the same active suspension system, if different control methods are used, it would produce different control effects. The current control methods of active suspension mainly comprise: ceiling damping control, optimal control, preview control, adaptive control, fuzzy control, neural network control, sliding mode control, immune evolution control, etc. According to records, no matter which control method is employed, the performance of the vehicle has been improved to varying degrees. Especially, the attitude adjustment and driving comfort control of the vehicle are two important aspects to be considered in suspension design. Most of the existing research results are based on the establishment of different mathematical models according to different needs, which are designed independently, and the overall performance of the vehicle is considered as the sum of them. Or a mathematical model can be broken down and then combined together for control. When the mathematical model is established, the designs of the attitude control and driving comfort control are not considered at the same time. The design process is complicated and it is difficult to obtain a good control effect.

SUMMARY OF PRESENT INVENTION

In order to solve the above problems, we propose a new active suspension control theory—a suspension inertia regulation principle. It is proposed based on a bionic principle. The reason why a cheetah can run at a speed of 120 km/h in an uneven field is mainly that it can regulate a supporting height and a supporting force of each claw according to front terrain, so that a center of mass moves along a smooth curve, and can maintain a relatively stable attitude. Based on this principle, the inertial regulation method of active suspensions based on terrain ahead of a vehicle proposed by the present invention is to: scan the terrain ahead of the vehicle by a laser radar, control the expansion of each group of suspensions independently according to the elevation information and driving parameters of the terrain ahead of the vehicle, so that the center of mass of the vehicle moves along a relatively smooth curve when the vehicle drives on an uneven road surface, and the attitude of the vehicle body can keep stable change as far as possible. Thus, the jolting and vibration of the vehicle body can be greatly reduced during driving, and the speed, driving comfort and handling stability of the vehicle driving on the uneven road surface can be improved.

In order to achieve the above control objectives, the main problem to be solved by the present invention is to plan a smoother moving trajectory than that of an original passive suspension vehicle during driving. Practice has proved that vehicle trajectory planning should not be based on geometry, because the trajectory planned by geometry generally does not conform to the law of vehicle kinematics and dynamics, that is, the position and pose of each time point on a vehicle trajectory planned by the geometry may not be realized by an actual vehicle. Therefore, reasonable trajectory planning should first conform to the law of kinematics and dynamics, and then ensure that all suspension stroke corresponding to each point on the trajectory should be within a limit stroke.

When the actual vehicle passes through the uneven road surface with passive suspensions, the trajectory from a start point to an end point is a kind of realistic existence, which is undoubtedly reasonable, that is, the vehicle moving in accordance with such a trajectory not only conforms to the law of kinematics and dynamics, but also the stroke of each suspension from the start point to the end point must be within the range of its limit stroke. More importantly, the trajectory of the vehicle would vary when it passes through the same distance with suspensions of different performances, and the stroke of each suspension is within the range of its limit stroke. That is, the trajectory of the vehicle from the start point to the end point can have a certain range of variation, which provides a theoretical basis for the trajectory planning of the active suspension vehicle in the present invention.

The vehicle trajectory planning idea proposed by the present invention is that, assuming that the vehicle can choose to use the passive suspension or active suspension, smoothing the vehicle trajectory by using the vehicle trajectory for which the uneven road surface is passed through with the passive suspensions, so that the vehicle drives with the active suspensions according to the smoothed new trajectory, and if the suspension stroke at each time point can be controlled within the range of the limit stroke, the active suspension control method can improve the driving comfort and handling stability of the vehicle. Under the condition that the suspension stroke does not exceed the limit stroke, the smoother the vehicle trajectory, the better the driving comfort and handling stability would be.

Based on the above idea, in a first aspect of the present invention, provided is an inertial regulation method of active suspensions based on terrain ahead of a vehicle, comprising the following steps:

S1: calculating trajectories of ground-contacted points of wheels and elevation information of ground-contacted point of each wheel when the vehicle passes through the terrain ahead of the vehicle.

According to position coordinates of the vehicle in a geodetic coordinate system measured by an inertial measurement unit and a dual-antenna GPS positioning system, and the terrain ahead of the vehicle scanned by a laser radar and a steering angle of each wheel, calculating, by vehicle kinematics, the trajectories $T_1, T_2, \ldots, T_m$ of all ground-contacted points of wheels when the vehicle is driving on the terrain ahead of the vehicle, wherein j=1, 2, ..., m, and m is a number of wheels. Calculating the elevation information of each planning data point on the trajectory of ground-contacted point of each wheel by an interpolation algorithm.

S2: calculating a trajectory of center of mass and an attitude history when the vehicle passes through the terrain ahead of the vehicle with passive suspensions.

S21: according to a vehicle speed, a steering angle, a driving/braking force of each wheel and a rolling friction coefficient of the wheel on the ground, calculating, from a vehicle dynamics model, a 6-dimensional coordinate history $\{X_i \ Y_i \ Z_i \ \alpha_i \ \beta_i \ \gamma_i\}^T$ of a vehicle coordinate system, the trajectory of center of mass and the attitude history $\{X_{Wi} \ Y_{Wi} \ Z_{Wi} \ \alpha_{Wi} \ \beta_{Wi} \ \gamma_{Wi}\}^T$ when the vehicle drives with the passive suspensions along the trajectories $T_1, T_2, \ldots, T_m$ of the ground-contacted points of wheels in step S1, wherein, $X_{Wi}$, $Y_{Wi}$, $Z_{Wi}$, $\alpha_{Wi}$, $\beta_{Wi}$, $\gamma_{Wi}$ are three-dimensional coordinates and three-dimensional attitude angles of the center of mass of the vehicle respectively, wherein i=0, 1, 2, ..., n, and n is the number of planned data points.

S22: taking a smoothness coefficient as $\xi$ performing a smoothing process crossing a start point on the trajectory of the center of mass and attitude history of the passive suspension vehicle in step S21 to obtain a smoothing function $\{X_W(t_i), Y_W(t_i), Z_W(t_i), \alpha_W(t_i), \beta_W(t_i), \gamma_W(t_i)\}^T$ of the trajectory of the center of mass and attitude history.

S3: based on the above-mentioned smooth-processed trajectory of the center of mass and attitude history, calculating the suspension stroke history $s_{i,j}$ and suspension supporting force history $W_{ij}$ when the vehicle passes through the terrain ahead of the vehicle with the active suspensions.

S31: taking the smooth-processed center of mass trajectory and attitude history of the vehicle in step S22 as inputs to calculate the stroke history $s_{i,j}{}^R$ and speed history $\dot{s}_{i,j}{}^R$ of each suspension relative to the passive suspension when the vehicle passes through the terrain ahead of the vehicle with the active suspensions, wherein j=1, 2, ..., m, and m is the number of wheels.

S32: under the conditions of the same speed of vehicle, steering angle, driving/braking force of each wheel and rolling friction coefficient of the wheel on the ground as in step S21, according to the stroke history $s_{i,j}{}^R$ and speed history $\dot{s}_{i,j}{}^R$ of active suspension relative to passive suspension obtained in step S31, calculating, from a dynamics model, a stroke history $s_{i,j}$ and a supporting force history $W_{ij}$ of each suspension relative to the median position when the vehicle passes through the terrain ahead of the vehicle with the active suspensions.

S4: according to the stroke history $s_{i,j}$ and the supporting force history $W_{ij}$ of each suspension relative to the median position when the vehicle passes through the terrain ahead of the vehicle with the active suspensions, performing an impedance control based on force-displacement on a suspension actuator.

Preferably, the specific vehicle dynamics model in S21 and S32 and solving thereof are as follows:

As shown in FIG. 2, establishing a fixed coordinate system OXYZ, which is fixedly connected with the ground, wherein the coordinate system takes a reference point O of the inertial measurement unit as the origin of coordinates, the front of the vehicle as a positive direction of Y axis, the right direction of the vehicle as a positive direction of X axis, and the upward direction perpendicular to the XOY plane as a positive direction of Z axis; in order to determine the position of the vehicle in the fixed coordinate system, introducing a vehicle coordinate system oxyz, which is fixedly connected with a vehicle body. The vehicle coordinate system coincides with the fixed coordinate system at an initial position, and positioning coordinates in the fixed coordinate system are X, Y, Z, $\alpha$, $\beta$, $\gamma$ respectively.

In order to improve a calculation speed, regarding the vehicle as a rigid body, setting the weight thereof as M and the coordinate thereof in the vehicle coordinate system as W $(x_W, y_W, z_W)$. The vehicle has m wheels and has m corresponding suspensions. The active suspension is simplified to a parallel connection of an actuator, a spring and a damper. Setting the control method of active suspension as a displacement control; setting the stiffness coefficients of suspension springs respectively as $K_{S1}, K_{S2}, \ldots, K_{Sm}$, and the damping coefficients of suspension dampers respectively as $C_{S1}, C_{S2}, \ldots, C_{Sm}$. Simplifying a tire as a parallel connection of a vertical spring and a damper, and ignoring the influence of lateral and tangential elasticity and damping of the tire on vehicle dynamics characteristics. Setting the stiffness coefficients of vertical springs of all tires as $K_{W1}, K_{W2}, \ldots, K_{Wm}$, and setting the damping coefficients of vertical dampers of all tires as $C_{W1}, C_{W2}, \ldots, C_{Wm}$. Setting the above-mentioned dampers as viscous dampers; and setting the above-mentioned springs as nonlinear springs and approximating the springs by piecewise linear.

The above is the dynamics model of the active suspension vehicle, which has 6 degrees of freedom. If the actuator in each suspension is removed, the above-mentioned dynamics model becomes the dynamics model of the passive suspension vehicle. It should be noted that when the suspension spring and damper are not provided in the design of partial active suspension, the suspension spring and damper in the above dynamics model of the active suspension vehicle should be omitted.

establishing a kinematic differential equation of the vehicle dynamics model by a Lagrange equation, which is expressed by matrix as follows:

$$[M_{6\times 6}]\{\ddot{q}_6\}+[C_{6\times 6}]\{\dot{q}_6\}+[K_{6\times 6}]\{q_6\}=\{F_6\}$$

In the formula, $[M_{6\times 6}]$, $[C_{6\times 6}]$ and $[K_{6\times 6}]$ are a weight matrix, a damping matrix and a stiffness matrix respectively, all of which are 6×6 symmetric square matrices; and $\{F_6\}$ is a force matrix which is a 6×1 array.

Taking a displacement vector of the vehicle in the fixed coordinate system as:

$$\{q_6\}=\{X,Y,Z,\alpha,\beta,\gamma\}^T$$

Constructing a dynamics matrix based on the above kinematic differential equation as follows:

$$\{\ddot{q}_6\}=[M_{6\times6}]^{-1}\{F_6\}-[M_{6\times6}]^{-1}[C_{6\times6}]\{\dot{q}_6\}-[M_{6\times6}]^{-1}[K_{6\times6}]\{q_6\}$$

Setting a state variable as:

$$\{q_{12}\} = \begin{Bmatrix} \{q_6\} \\ \{\dot{q}_6\} \end{Bmatrix} = \{X \ Y \ Z \ \alpha \ \beta \ \gamma \ \dot{X} \ \dot{Y} \ \dot{Z} \ \dot{\alpha} \ \dot{\beta} \ \dot{\gamma}\}^T$$

Substituting the state variable into the dynamics matrix to obtain a state equation as follows:

$$\{\dot{q}_{12}\} = [E]\{q_{12}\} + \{F^*\}$$

Wherein, $$[E] = \begin{bmatrix} [0]_{6\times6} & [I]_{6\times6} \\ -[M_{6\times6}]^{-1}[K_{6\times6}] & -[M_{6\times6}]^{-1}[C_{6\times6}] \end{bmatrix},$$

$$\{F^*\} = \begin{Bmatrix} \{0\}_6 \\ [M_{6\times6}]^{-1}\{F_6\} \end{Bmatrix}$$

The above state equation can be solved by a fourth order Runge-Kutta method to obtain the value of the state variable $\{q_{12}\}$.

Preferably, a specific method of calculating a trajectory of center of mass and an attitude history when the vehicle passes through the terrain ahead of the vehicle with passive suspensions in S21 is as follows:

calculating three coordinates related to the suspension characteristics in the vehicle trajectory history by a time point $\{q_{12}\}_i$, calculated from the dynamics model, at which the vehicle passes through the terrain ahead of the vehicle with the passive suspensions as follows:

$$\begin{cases} Z_{W_i} = Z + z_W + y_W\alpha_i - x_W\beta_i \\ \alpha_{W_i} = \alpha_i \\ \beta_{W_i} = \beta_i \end{cases}, i = 0, 1, 2, \ldots, n$$

the above formula is obtained by assuming that $\alpha$ and $\beta$ are tiny variables, taking $\cos\alpha\approx1$, $\cos\beta\approx1$, $\sin\alpha\approx\alpha$, $\sin\beta\approx\beta$, and ignoring deformation of the vehicle body.

Preferably, in the step S31, specific steps of calculating the stroke history $s_{i,j}^R$ and speed history $\dot{s}_{i,j}^R$ of each suspension relative to the passive suspension when the vehicle passes through the terrain ahead of the vehicle with the active suspensions are as follows:

(1) based on the 6-dimensional coordinate history $\{X_i \ Y_i \ Z_i \ \alpha_i \ \beta_i \ \gamma_i\}^T$ of the vehicle coordinate system when the vehicle passes through the terrain ahead of the vehicle with the passive suspensions obtained in S21, solving a vertical displacement history of supporting points $Q_1, Q_2, \ldots, Q_m$ on all suspensions by the following formula:

$$w_{i,j}^P=Z_i-b_j\beta_i+L_j\alpha_i, i=0,1,2,\ldots,n; j=1,2,\ldots,m$$

in the formula, $b_j$ is x coordinate of the supporting point on the suspension numbered j in the oxyz coordinate system; $L_j$ is y coordinate of the supporting point on the suspension numbered j in the oxyz coordinate system.

then a vertical speed history of the supporting points $Q_1, Q_2, \ldots, Q_m$ on all suspensions is:

$$\dot{w}_{i,j}^P=\dot{Z}_i-b_j\dot{\beta}_i+L_j\dot{\alpha}_i, i=0,1,2,\ldots,n; j=1,2,\ldots,m$$

(2) according to the function $\{X_W(t_i), Y_W(t_i), Z_W(t_i), \alpha_W(t_i), \beta_W(t_i), \gamma_W(t_i)\}^T$ of the center of mass trajectory and attitude history obtained after smoothing process in S22, inversely calculating a time history function of the three coordinates of the vehicle coordinate system relative to the fixed coordinate system as follows:

$$\begin{cases} Z(t_i) = Z_W(t_i) - z_W - y_W\alpha(t_i) + x_W\beta(t_i) \\ \alpha(t_i) = \alpha_W(t_i) \\ \beta(t_i) = \beta_W(t_i) \end{cases}, i = 0, 1, 2, \ldots, n$$

then solving a vertical displacement of the supporting points $Q_1, Q_2, \ldots, Q_m$ on all suspensions from $z(t_i)$, $\alpha(t_i)$, $\beta(t_i)$ as follows:

$$w_{i,j}^A=Z_j(t_i)-b_j\beta(t_i)+L_j\alpha(t_i), i=0,1,2,\ldots,n; j=1,2,\ldots,m$$

a vertical speed of the supporting points $Q_1, Q_2, \ldots, Q_m$ on all suspensions is:

$$\dot{w}_{i,j}^A=\dot{Z}_j(t_i)-b_j\dot{\beta}(t_i)+L_j\dot{\alpha}(t_i), i=0,1,2,\ldots,n; j=1,2,\ldots,m$$

(3) calculating the stroke history $s_{i,j}^R$ and speed history $\dot{s}_{i,j}^R$ of each active suspension relative to the passive suspension the stroke history of each active suspension relative to the passive suspension is equal to the difference between the vertical displacement $w_{i,j}$ history $w_{i,j}$ of the supporting points on each active suspension after the smoothing process and the vertical displacement history $w_{i,j}^P$ of the supporting points on the passive suspension before the smoothing process:

$$s_{i,j}=w_{i,j}-w_{i,j}^P, i=0,1,2,\ldots,n; j=1,2,\ldots,m$$

the speed history of each active suspension relative to the passive suspension is equal to the difference between the vertical speed history $\dot{w}_{i,j}$ of the supporting points on each active suspension after the smoothing process and $\dot{w}_{i,j}^P$ the vertical speed history $\dot{w}_{i,j}^P$ of the supporting points on the passive suspension before the smoothing process:

$$\dot{s}_{i,j}=\dot{w}_{i,j}-\dot{w}_{i,j}^P, i=0,1,2,\ldots,n; j=1,2,\ldots,m.$$

Preferably, the specific steps of calculating, from a dynamics model of the vehicle, a stroke history $s_{i,j}$ and a supporting force history $W_{ij}$ of each suspension of the vehicle when the vehicle passes through the terrain ahead of the vehicle with the active suspensions in step S32 are as follows:

(1) solving the vertical displacement history $w'_{i,j}$ and vertical speed history $\dot{w}'_{i,j}$ of the supporting points on each active suspension, wherein according to stroke difference history $s_{i,j}^R$ and speed difference history $\dot{s}_{i,j}^R$ of the active/passive suspension, solving, from the dynamics model of the vehicle, a new state variable $\{q'_{12}\}_i$ when the vehicle passes through the terrain ahead of the vehicle, and substituting displacement variables $z'_i$, $\alpha'_i$, $\beta'_i$ contained in the new state variable into the following formula to calculate the vertical displacement history of the supporting points $Q_1, Q_2, \ldots, Q_m$ on each suspension:

$$w'_{i,j}=z'_i-b_j\beta'_i+L_j\alpha'_i, i=0,1,2,\ldots,n; j=1,2,\ldots,m$$

substituting the values of speed variables $\dot{z}'_i$, $\dot{\alpha}'_i$, $\dot{\beta}'_i$ into the following formula to calculate the vertical speed history of the supporting points $Q_1, Q_2, \ldots, Q_m$ on all suspensions as follows:

$$\dot{w}'_{i,j}=\dot{z}'_i-b_j\dot{\beta}'_i+L_j\dot{\alpha}'_i, i=0,1,2,\ldots,n; j=1,2,\ldots,m$$

(2) solving the stroke history $s_{i,j}$ of each active suspension relative to the median position, wherein because the vertical deformation of the tire is far less than the stroke of the active suspension, the vertical deformation of the tire is omitted; the vertical deformation of the tire is compensated in a suspension impedance control in S4. The stroke history of each active suspension relative to the median position is equal to the difference between the vertical displacement history $w'_{i,j}$ of the supporting points $Q_1, Q_2, \ldots, Q_m$ on all suspensions and the vertical displacement history $\Delta_{i,j}$ of ground-contacted points of all wheels $R_1, R_2, \ldots, R_m$.

$$s_{i,j}=w_{i,j}-w_{i,j}^P, i=0,1,2,\ldots,n; j=1,2,\ldots,m$$

(3) calculating the supporting force history $W_{i,j}$ of each active suspension, wherein the supporting force history of each active suspension of the vehicle is as follows:

$$W_{i,j}=K_{jZ}(w'_{i,j}-s_0-s_{i,j}^R-\Delta_{i,j})+C_{jZ}(\dot{w}'_{i,j}-\dot{s}_{i,j}^R-\dot{\Delta}_{i,j}), i=0,1,2,\ldots,n; j=1,2,\ldots,m$$

in the formula, $\Delta_{i,j}$ and $\dot{\Delta}_{i,j}$ are respectively the vertical displacement history and speed history of the ground-contacted points of wheels $R_1, R_2, \ldots, R_m$.

Preferably, the specific realization method of performing an impedance control based on force-displacement on a suspension actuator in the S4 is as follows:

① solving the displacement control quantity of suspension impedance control setting the measured value of the current suspension supporting force as $W_{i,j}^c$, and using the following formula to express the relationship between the difference between a theoretical supporting force and an actual supporting force of the suspension and an expected suspension stroke increment $\delta_{i,j}$:

$$\Delta W_{i,j}=W_{i,j}-W_{i,j}^c=M\ddot{\delta}_{i,j}+C\dot{\delta}_{i,j}+K\delta_{i,j}, i=0,1,2,\ldots,n; j=1,2,\ldots,m$$

in the formula, M, K and C are target inertia, target stiffness and target damping respectively and reflect the inertia characteristics of spring weight, stiffness characteristics and damping characteristics of tire contacting the ground respectively. The above differential equation can be solved by means of convolution integral:

$$\delta_{i,j}=\int_0^t \Delta W_{i,j}(\tau)h_{i,j}(t-\tau)d\tau, i=0,1,2,\ldots,n; j=1,2,\ldots,m$$

the function $h_{i,j}(t)$ in the above formula is the corresponding unit impulse response function of the previous formula.

The above formula can be solved by an FFT algorithm. In actual control, since the moving speed and acceleration of each suspension stroke increment $\delta_{i,j}$ of the vehicle are relatively small, it can be considered that $\ddot{\delta}_{i,j}\approx\dot{\delta}_{i,j}\approx 0$ and then a contact force model between the wheel and the ground can be simplified as:

$$\delta_{i,j}=\frac{\Delta W_{i,j}}{K}, i=0,1,2,\ldots,n; j=1,2,\ldots,m$$

② impedance control of active suspensions based on force-displacement

Setting the measured value of the suspension relative to the median position stroke as $s_{i,j}^c$, and designing a disturbance self-rejection controller by taking $1_d=1_z+\Delta 1_z, s_{i,j}^d=s_{i,j}+\delta_{i,j}$ as a target stroke, so as to realize displacement follow-up control of each suspension actuator.

Preferably, the S4 further comprises a content for verifying whether the suspension stroke $s_{i,j}^d$ in the whole history exceeds the limit stroke before the implementation of impedance control based on the force-displacement.

the verification formula is:

$$s_{min}\leq s_{i,j}^d\leq s_{max}, i=0,1,2,\ldots,n; j=1,2,\ldots,m$$

in the formula, $s_{min}$ is a lower limit displacement of the suspension;

$s_{max}$ is an upper limit displacement of the suspension.

If there is a certain suspension stroke exceeding the limit stroke, the smoothness of a vehicle trajectory curve is reduced first, and the corresponding smoothness coefficient $\xi$ is adjusted, it is handled according to the following two cases respectively:

(1) if the smoothness coefficient $\xi$ has not reached a preset smoothness coefficient limit value, then proceeding to step S22.

(2) if the smoothness coefficient $\xi$ has reached the limit value and it still cannot meet the condition that each suspension stroke in the whole history does not exceed the limit stroke, finding a first data point with the suspension stroke exceeding the limit stroke according to the time sequence of occurrence, and setting the number of planned data point in step S2 as $i_E(1\leq i_E\leq n)$, then letting $n=i_E$ and returning to step S21.

Each suspension stroke in the whole history is made no more than the limit stroke through the above processing.

In a second aspect of the present invention, provided is a control system applying the above-mentioned inertial regulation method of active suspensions based on terrain ahead of a vehicle. As shown in FIG. 1, the system comprises a vehicle body and m wheels, a laser radar, an inertial measurement unit, a dual antenna GPS positioning system, the suspension cylinders corresponding to the wheels, displacement sensors, supporting force sensors and a servo controller group thereof, a vehicle speed sensor, a steering wheel angle sensor, a throttle opening degree sensor, a braking force sensor, an electronic control unit, wherein the laser radar, the inertial measurement unit, the dual-antenna GPS positioning system, the electronic control unit and the servo controller group are fixed on the vehicle body, and the laser radar is installed on the front of the vehicle body for measuring the terrain ahead of the vehicle, and the two antennas of the dual antenna GPS positioning system are separated by a certain distance in space; the wheel is connected to the vehicle body through the suspension cylinder, and the displacement sensor and the supporting force sensor are installed on the suspension cylinder for measuring the stroke and supporting force of the suspension cylinder; the steering wheel angle sensor, the throttle opening degree sensor and the braking force sensor are used to measure a steering angle, a throttle opening degree and a braking strength; the electronic control unit respectively communicates with the inertial measurement unit, the laser radar, the dual antenna GPS positioning system, the steering wheel angle sensor, the throttle opening degree sensor, the braking force sensor, and the servo controller group, and the servo controller group communicates with the displacement sensor and supporting force sensor of the suspension cylinder.

By adopting the above-mentioned technical solution, the technical progress of the present invention is as follows:

Compared with the existing active suspension technology, the present invention has the advantage that it can unify the attitude adjustment control and driving comfort control, so that the suspension performance can be greatly improved. The traditional active suspension control is mainly to control the suspension stiffness and damping or suspension stroke according to the driving condition of the vehicle, rather than to control the position and pose of the vehicle. Therefore, there are uncontrollable factors of vehicle position and post during driving, which affect the driving comfort, handling stability and driving safety. In particular, when the ground is uneven and the degree of softness changes greatly, the risk of loss of control increases abruptly. With the inertial control method and control system of active suspensions based on the terrain ahead of the vehicle proposed in the present invention, the position and post of the vehicle are controlled by controlling the expansion of each group of suspension; through the force-displacement impedance control of the suspension, the disturbance caused by the change of the degree of softness and hardness of the ground can be overcome, so that the center of mass of the vehicle moves along the predetermined smooth curve and the attitude remains basically stable, thus greatly improving the driving speed, driving comfort and handling stability of the vehicle driving on the unstructured road surface.

DESCRIPTION OF THE EMBODIMENTS

Figure 1:
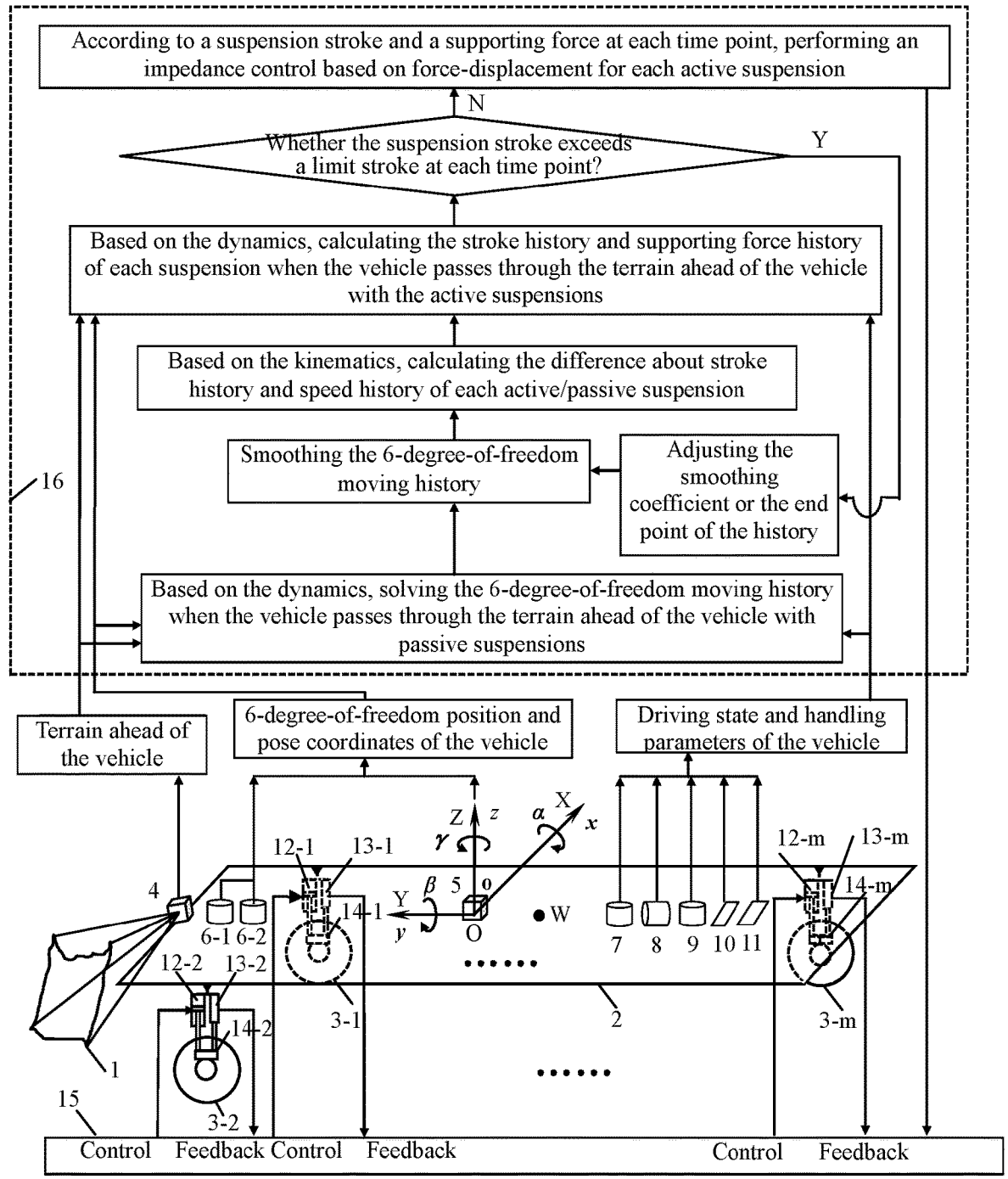
FIG. 1 shows a structural schematic diagram of an inertial regulation system of active suspensions based on terrain ahead of a vehicle.
Figure 2:
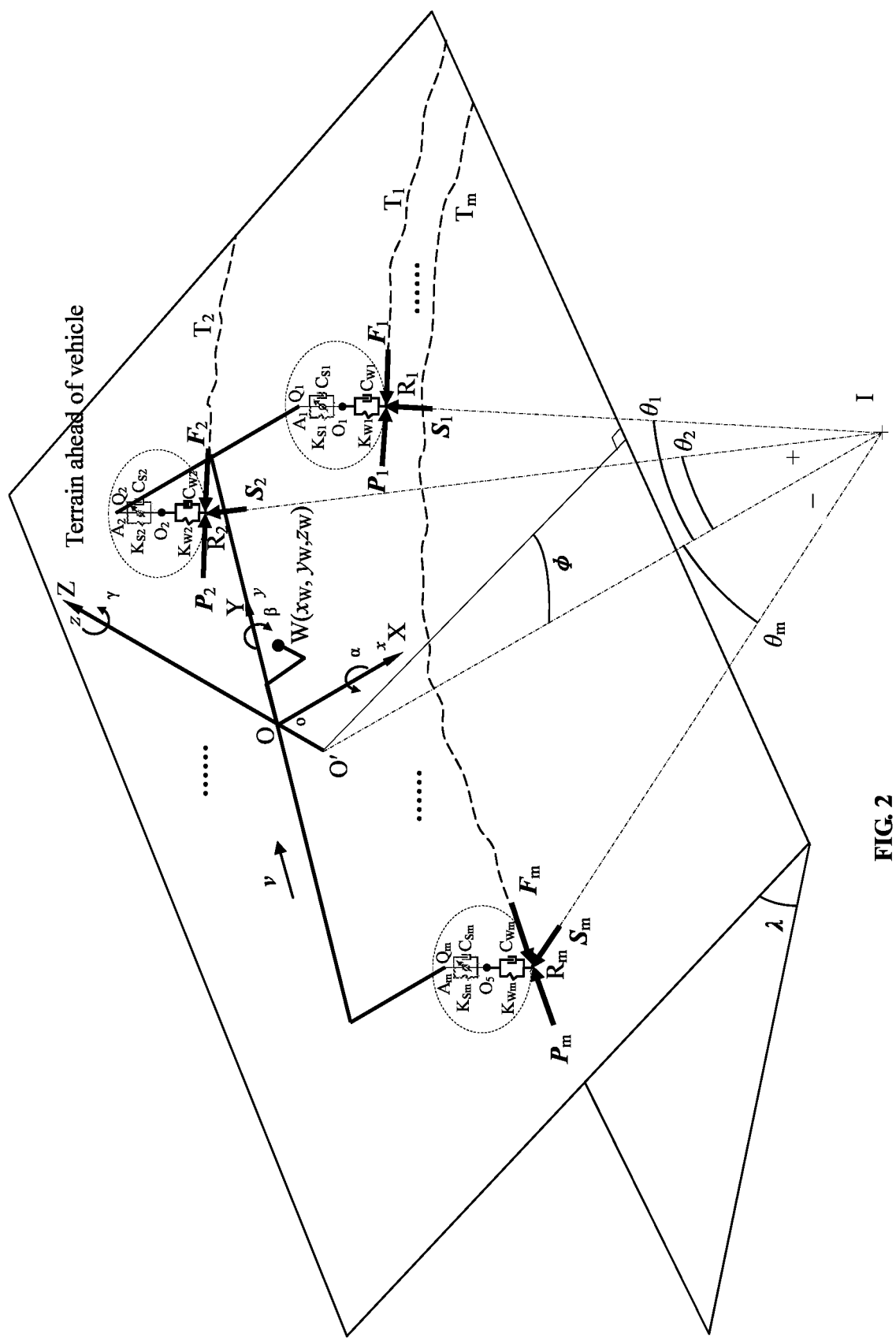
FIG. 2 is a dynamics model of a multi-axle active suspension vehicle driving on an uneven slope.

In the following, the present invention is a further described in detail in combination with embodiments:

1. An Inertial Regulation System of Active Suspensions Based on Terrain Ahead of a Vehicle As shown in FIG. 1, the system comprises terrain 1 ahead of the vehicle, a vehicle body 2 and m wheels 3-1, 3-2, . . . , 3-*m*, a laser radar 4, an inertial measurement unit 5, a dual antenna GPS positioning system 6-1, 6-2, a vehicle speed sensor 7, a gear position sensor 8, a steering wheel angle sensor 9, a throttle opening degree sensor 10, and a braking force sensor 11, and suspension cylinders 12-1, 12-2, . . . , 12-*m* corresponding to the wheels and their displacement sensors 13-1, 13-2, . . . , 13-*m* and supporting force sensors 14-1, 14-2, . . . , 14-*m*, a servo controller group 15, and an electronic control unit 16, etc. Wherein, the laser radar 4, the inertial measurement unit 5, two antennas 6-1, 6-2 of the dual antenna GPS positioning system, the electronic control unit 16 and the servo controller group 15 are fixed on the vehicle body 2, and the laser radar 4 is installed on the front of the vehicle body 2 for measuring the terrain ahead of the vehicle. The two antennas 6-1, 6-2 of the dual antenna GPS positioning system are separated by a certain distance in space. The wheels 3-1, 3-2, . . . , 3-*m* is connected to a lower part of the vehicle body 2 through the suspension cylinders 12-1, 12-2, . . . , 12-*m*. The displacement sensors 13-1, 13-2, . . . , 13-*m* and the supporting force sensors 14-1, 14-2, . . . , 14-4 installed on the suspension cylinders 12-1, 12-2, . . . , 12-*m* are used to measure strokes and supporting forces of the suspension cylinders respectively. The electronic control unit 16 respectively communicates with the laser radar 4, the inertial measurement unit 5, the two antennas 6-1, 6-2 of the dual antenna GPS positioning system, the vehicle speed sensor 7, the gear position sensor 8, the steering wheel angle sensor 9, the throttle opening degree sensor 10 and the braking force sensor 11, and the servo controller group 15. The servo controller group 15 communicates with the displacement sensors 13-1, 13-2, . . . , 13-*m* and the supporting force sensors 14-1, 14-2, . . . , 14-*m* of the suspension cylinders.

The inertial regulation method of active suspensions based on the terrain ahead of the vehicle comprises the following steps.

S1: calculating trajectories of ground-contacted points of wheels and the elevation information of ground-contacted point of each wheel when the vehicle passes through the terrain ahead of the vehicle Based on position coordinates of the vehicle in a geodetic coordinate system measured by the inertial measurement unit 5 and two antennas 6-1, 6-2 of the dual-antenna GPS positioning system, the terrain 1 ahead of the vehicle scanned by the laser radar 4 and steering angles $\theta_1$, $\theta_2$, . . . , $\theta_m$ of all wheels measured by the steering wheel angle sensor, calculating, by vehicle kinematics, the trajectories $T_1$, $T_2$, . . . , $T_m$ of ground-contacted points of wheels 3-1, 3-2, . . . , 3-*m* when the vehicle is driving on the terrain 1 ahead of the vehicle, wherein m is the number of wheels. Further, calculating the elevation information of each planning data point on the trajectory of ground-contacted point of wheel by an interpolation algorithm.

S2: calculating a trajectory of center of mass and an attitude history when the vehicle passes through the terrain ahead of the vehicle with passive suspensions S21: calculating a trajectory of center of mass and an attitude history when the vehicle passes through the terrain ahead of the vehicle with passive suspensions According to a rolling friction coefficient determined by the ground geological conditions, the speed of vehicle measured by the vehicle speed sensor 7, the steering angle measured by the steering wheel angle sensor 9, the driving force of each wheel measured by the gear position sensor 8 and the throttle opening degree sensor 10, the braking force measured by the braking force sensor 11, calculating, from a passive suspension vehicle dynamics model, 6-dimensional coordinate history $\{X_i \ Y_i \ Z_i \ \alpha_i \ \beta_i \ \gamma_i\}^T$ of the vehicle coordinate system and the center of mass trajectory and attitude history $\{X_{wi} \ Y_{wi} \ Z_{wi} \ \alpha_{wi} \ \beta_{wi} \ \gamma_{wi}^T\}$ of the vehicle when the vehicle drives along the trajectory $T_1, T_2, \ldots, T_m$ of ground-contacted points of wheels planned in step S1 with the passive suspensions, wherein, $X_{wi}$, $Y_{wi}$, $Z_{wi}$, $\alpha_{wi}$, $\beta_{wi}$, $\gamma_{wi}$ are the three-dimensional coordinates and three-dimensional attitude angle of the center of mass of the vehicle respectively and correspond to all scan cycle nodes $t_i = i\Delta T$ of the suspension control in a time order, wherein i=0, 1, 2, . . . , n, $\Delta T$ represents the scan cycle and n represents the number of planned data points.

In the dynamics model of passive suspension vehicle, the comprehensive stiffness coefficient and comprehensive damping coefficient of each passive suspension branch chain formed by connecting the spring and damping of the suspension and the spring and damping of the tire in series can be calculated as follows:

$$K_{Zi}^P = \frac{K_{Si}K_{Wi}}{K_{Si}+K_{Wi}}, C_{Zi}^P = \frac{C_{Si}C_{Wi}}{C_{Si}+C_{Wi}} \quad i=0,1,2,\ldots,n$$

S22: smoothing the center of mass trajectory and attitude history of the vehicle in step S21

Taking the smoothness coefficient as ξ smoothing the center of mass trajectory and attitude history of the passive suspension vehicle driving on the terrain ahead of the vehicle in step S21. In order to improve the processing speed, this kind of smoothing is not for the 6 degrees of freedom space curved surface, but for the 6 degrees of freedom space coordinates independently. There are many commonly used smoothing methods, but the smoothing method applicable to the present invention requires that the smoothed curve must pass a data start point, otherwise it would cause unnecessary vibration of the vehicle. The center of mass trajectory and attitude history after smoothing are $\{x_W(t_i), y_W(t_i), z_W(t_i), \alpha_W(t_i), \beta_W(t_i), \gamma_W(t_i)\}^T$, i=0, 1, 2, ..., n, wherein the components are independent of each other and are functions of time.

S3: based on the smooth-processed trajectory of the center of mass and attitude history, calculating the suspension stroke history $s_{ij}$ and suspension supporting force history $W_{ij}$ when the vehicle passes through the terrain ahead of the vehicle with the active suspensions.

S31: taking the smooth-processed center of mass trajectory and attitude history of the vehicle in step S22 as inputs to calculate the stroke history $s_{i,j}^R$ and speed history $\dot{s}_{i,j}^R$ of each suspension relative to the passive suspension when the vehicle passes through the terrain ahead of the vehicle with the active suspensions, wherein j=1, 2, ..., m, and m is the number of wheels.

S32: under the conditions of the same speed of vehicle, steering angle, driving/braking force of each wheel and rolling friction coefficient of the wheel on the ground as in step S21, according to the stroke history $s_{i,j}^R$ and speed history $\dot{s}_{i,j}^R$ of active suspension relative to passive suspension obtained in step S31, calculating, from an active suspension dynamics model, a stroke history $s_{ij}$ and a supporting force history $W_{ij}$ of each suspension relative to the median position when the vehicle passes through the terrain ahead of the vehicle, wherein i=0, 1, 2, ..., n, j=1, 2, ..., m.

Since the actuator of active suspension adopts displacement control, the influence of suspension spring and suspension damping in parallel with the actuator can be ignored in the dynamics calculation of active suspension, and the comprehensive stiffness coefficient and comprehensive damping coefficient of each active suspension branch chain are respectively $K_{Zi}^A = K_{Wi}$, $C_{Zi}^A = C_{Wi}$.

Figure 3:
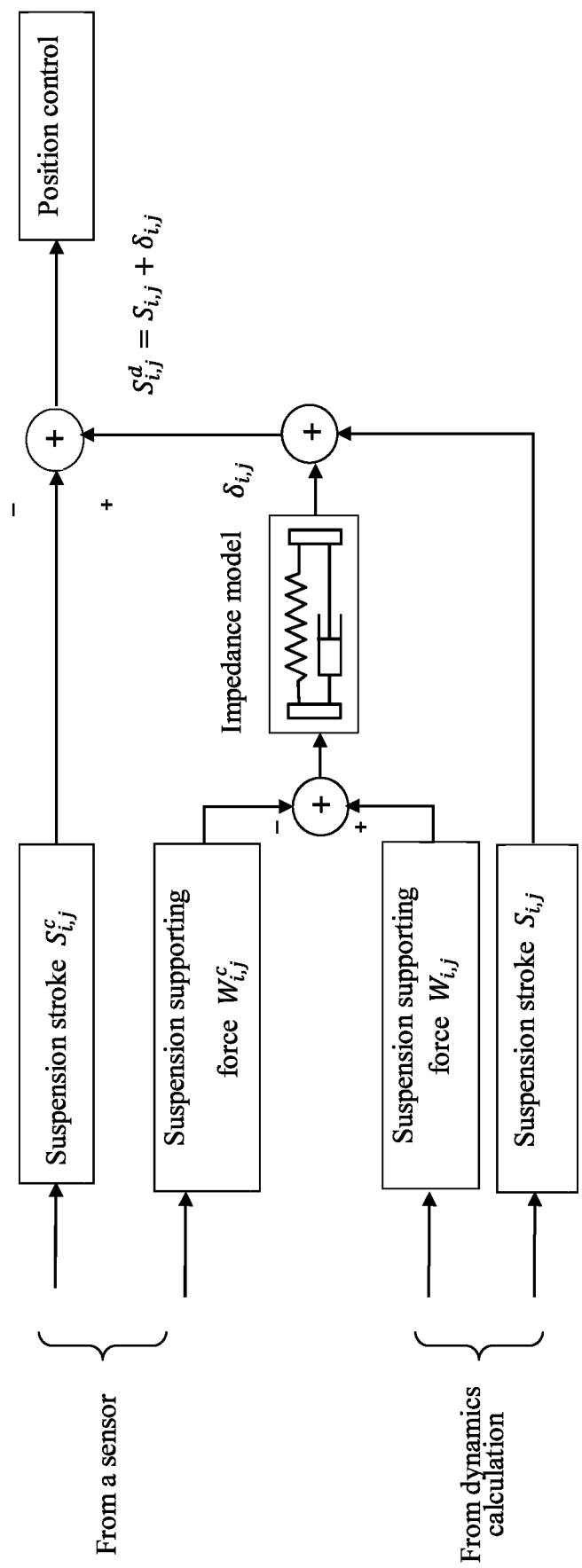
FIG. 3 is a schematic diagram of impedance control based on force-displacement for a suspension.

S4: performing impedance control on the active suspension vehicle based on the force-displacement As shown in FIG. 3, $s_{ij}$ is the active suspension stroke calculated based on step S31, and $W_{ij}$ is the supporting force of each suspension calculated based on step S32. Correspondingly, $s_{i,j}^c$ is the actual stroke of each suspension measured through the displacement sensors 13-1, 13-2, ..., 13-m, $W_{i,j}^c$ is the actual supporting force of each suspension measured through the supporting force sensors 14-1, 14-2, ..., 14-m. By comparing the theoretical value $W_{ij}$ and measured value $W_{i,j}^c$ of the supporting force of each suspension, the stroke increment $\delta_{i,j}$ of each suspension of the vehicle can be obtained based on the impedance model, so as to obtain the theoretical stroke $s_{i,j}^d = s_{i,j} + \delta_{i,j}$ of each suspension after correction, and then compare it with the measured stroke $s_{i,j}^c$ of each suspension, and finally implement the displacement control of the suspension according to the difference value.

In the following, taking a three-axle vehicle as an example, and illustrative embodiments, features and methods of the present invention are described in detail with reference to FIG. 4. Other vehicles with three or more wheels can be constructed in the same way as in this example.

1. A Hardware Structure of the System

Figure 4:
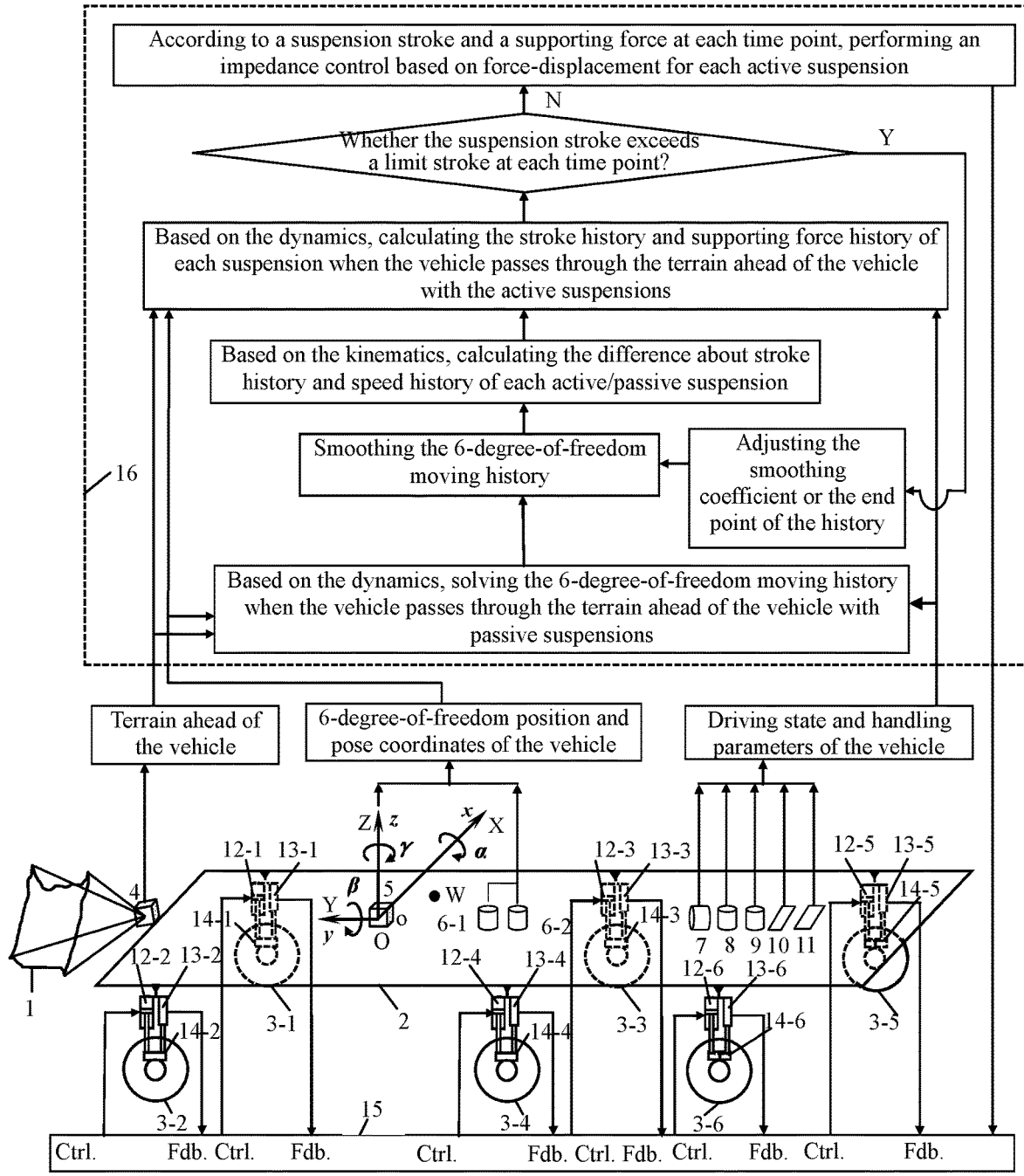
FIG. 4 shows a structural schematic diagram of an inertial regulation system of active suspensions of a three-axle vehicle based on terrain ahead of a vehicle.

The inertial regulation system of the active suspension of a three-axle vehicle based on the terrain ahead of the vehicle is as shown in FIG. 4. The system comprises terrain 1 ahead of the vehicle, a vehicle body 2 and 6 wheels 3-1, 3-2, ..., 3-6, a laser radar 4, an inertial measurement unit 5, the two antennas 6-1, 6-2 of a dual antenna GPS positioning system, a vehicle speed sensor 7, a gear position sensor 8, a steering wheel angle sensor 9, a throttle opening degree sensor 10, and a braking force sensor 11, and suspension cylinders 12-1, 12-2, ..., 12-6 corresponding to the wheels 3-1, 3-2, ..., 3-6 and their displacement sensors 13-1, 13-2, ..., 13-6 and supporting force sensors 14-1, 14-2, ..., 14-6, a servo controller group 15, and an electronic control unit 16, etc. Wherein, the laser radar 4, the inertial measurement unit 5, two antennas 6-1, 6-2 of the dual antenna GPS positioning system, the electronic control unit 16 and the servo controller group 15 are fixed on the vehicle body 2, and the laser radar 4 is installed on the front of the vehicle body 2 for measuring the terrain ahead of the vehicle. The two antennas 6-1, 6-2 of the dual antenna GPS positioning system are separated by a certain distance in space. The wheels 3-1, 3-2, ..., 3-6 is connected to a lower part of the vehicle body 2 through the suspension cylinders 12-1, 12-2, ..., 12-6. The displacement sensors 13-1, 13-2, ..., 13-6 and the supporting force sensors 14-1, 14-2, ..., 14-6 installed on the suspension cylinders 12-1, 12-2, ..., 12-6 are used to measure strokes and supporting forces of the suspension cylinders respectively. The electronic control unit 16 respectively communicates with the laser radar 4, the inertial measurement unit 5, the two antennas 6-1, 6-2 of the dual antenna GPS positioning system, the vehicle speed sensor 7, the gear position sensor 8, the steering wheel angle sensor 9, the throttle opening degree sensor 10, the braking force sensor 11, and the servo controller group 15. The servo controller group 15 communicates with the displacement sensors 13-1, 13-2, ..., 13-6 and the supporting force sensors 14-1, 14-2, ..., 14-6 of the suspension cylinders.

Figure 5:
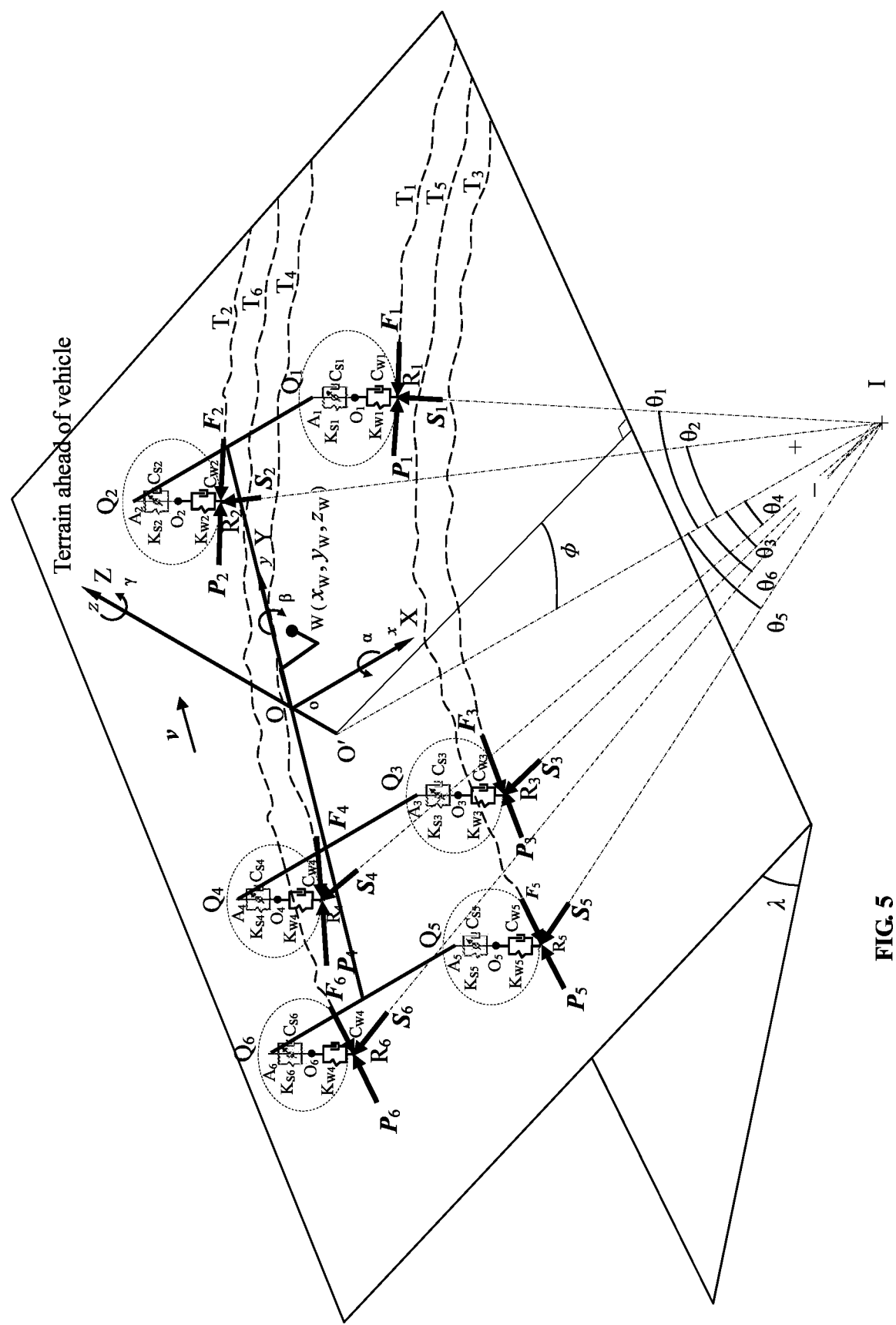
FIG. 5 is a dynamics model of a three-axle active suspension vehicle driving on an uneven slope.

2. A Dynamics Model of a Three-Axle Vehicle and a Solving Example (1) The Dynamics Model of Three-Axle Active Suspension Vehicle Driving on an Uneven Slope As shown in FIG. 5, establishing a fixed coordinate system OXYZ, which is fixedly connected with the ground, wherein the coordinate system takes a reference point O of the inertial measurement unit as the origin of coordinates, the right of the vehicle as a positive direction of X axis, the front of the vehicle as a positive direction of Y axis, and the upward direction perpendicular to the XOY plane as a positive direction of Z axis; in order to determine the position of the vehicle in the fixed coordinate system, introducing a vehicle coordinate system oxyz, which is fixedly connected with a vehicle body. The vehicle coordinate system coincides with the fixed coordinate system at an initial position, and positioning coordinates in the fixed coordinate system are X, Y, Z, α, β, γ respectively.

In order to improve a calculation speed, regarding the vehicle as a rigid body, setting the weight thereof as M and the coordinate thereof in the vehicle coordinate system as W $(x_W, y_W, z_W)$. The three-axle vehicle has 6 wheels and has 6 corresponding suspensions. The active suspension is simplified to a parallel connection of an actuator, a spring and a damper. Setting the control method of active suspension as a displacement control; setting the stiffness coefficients of suspension springs respectively as $K_{S1}$, $K_{S2}$, ..., $K_{S6}$, and the damping coefficients of suspension dampers respectively as $C_{S1}$, $C_{S2}$, ..., $C_{S6}$. Simplifying a tire as a parallel connection of a vertical spring and a damper, and ignoring the influence of lateral and tangential elasticity and damping of the tire on vehicle dynamics characteristics. Setting the stiffness coefficients of vertical springs of all tires as $K_{W1}$, $K_{W2}$, ..., $K_{W6}$, and setting the damping coefficients of vertical dampers of all tires as $C_{W1}$, $C_{W2}$, ..., $C_{W6}$. Setting the above-mentioned dampers as viscous dampers; and setting the above-mentioned springs as nonlinear springs and approximating the springs by piecewise linear.

The above is the dynamics model of the active suspension vehicle, which has 6 degrees of freedom. If the actuator in each suspension is omitted, the above-mentioned dynamics model becomes the dynamics model of the passive suspension vehicle. At this time, the comprehensive stiffness coefficient and comprehensive damping coefficient of each passive suspension branch chain are as follows:

$$K_{Zi}^P = \frac{K_{Si} K_{Wi}}{K_{Si} + K_{Wi}}, \quad C_{Zi}^P = \frac{C_{Si} C_{Wi}}{C_{Si} + C_{Wi}}$$

In this embodiment, when designing the stroke median position of the active suspension, it corresponds to a balance position of the passive suspension. In this way, when the active suspension is stationary in the median position, the theoretical supporting force of the actuator should be zero, which can minimize the energy consumption of the vehicle due to the use of the active suspension, and at the same time, it can produce small impact when the active/passive suspension is switched. Since the actuator of suspension adopts displacement control, in this embodiment, the functions of the suspension spring and damper in parallel with the actuator in the dynamics model of the active suspension vehicle are omitted, so the comprehensive stiffness coefficient and comprehensive damping coefficient of each active suspension branch chain are:

$$K_{Zi}^A = K_{Wi}, \quad C_{Zi}^A = C_{Wi}$$

Because of the strong nonlinearity of the suspension branch chain spring, piecewise linear approximation is used in this embodiment, and because each branch chain may be in different linear segments, $K_{Z1}$, ..., $K_{Z6}$ and $C_{Z1}$, ..., $C_{Z6}$ respectively represents the vertical stiffness and damping of each branch chain. Using $\Delta_1(t)$, $\Delta_2(t)$, ..., $\Delta_6(t)$ and $\dot{\Delta}_1(t)$, $\dot{\Delta}_2(t)$, ..., $\dot{\Delta}_6(t)$ to respectively represent the vertical displacement and speed of ground-contacted points $R_1$, $R_2$, ..., $R_6$ of all wheels caused by road unevenness. When a wheel is off the ground, the elasticity and damping of its corresponding suspension branch chain should be set to zero.

Since $\alpha$ and $\beta$ are tiny variables in each scanning cycle, then $\cos \alpha \approx 1$, $\cos \beta \approx 1$; $\sin \alpha \approx \alpha$, $\sin \beta \approx \beta$. The coordinate calculation formula of the center of mass of the vehicle in the fixed coordinate system OXYZ is:

$$\begin{cases} X_W = X + x_W + z_W \beta - y_W \gamma \\ Y_W = Y + y_W - z_W \alpha + x_W \gamma \\ Z_W = Z + z_W + y_W \alpha - x_W \beta \end{cases}$$

In the formula, $x_W$, $y_W$, $z_W$ is the coordinate of the center of mass of the vehicle in the vehicle coordinate system oxyz.

Based on the dynamics model and Lagrange equation, a motion differential equation of the active suspension vehicle is established, which is expressed by the matrix as follows:

$$[M_{6 \times 6}]\{\ddot{q}_6\} + [C_{6 \times 6}]\{\dot{q}_6\} + [K_{6 \times 6}]\{q_6\} = \{F_6\}$$

In the formula, $[M_{6 \times 6}]$, $[C_{6 \times 6}]$ and $[K_{6 \times 6}]$ are a weight matrix, a damping matrix and a stiffness matrix respectively, all of which are 6×6 symmetric square matrices; $\{F_6\}$ is a force matrix which is a 6×1 array; and $\{q_6\}$ is a column vector of the vehicle coordinate to be solved, and is a 6×1 array. Wherein, $$[M_{6\times 6}] = \begin{bmatrix} M & 0 & 0 & 0 & Mz_W & -My_W \\ 0 & M & 0 & -Mz_W & 0 & Mx_W \\ 0 & 0 & M & My_W & -Mx_W & 0 \\ 0 & -Mz_W & My_W & J_{XX} + M(y_W^2 + z_W^2) & -(J_{XY} + Mx_W y_W) & -(J_{XZ} + Mx_W z_W) \\ Mz_W & 0 & -Mx_W & -(J_{XY} + Mx_W y_W) & J_{YY} + M(x_W^2 + z_W^2) & -(J_{YZ} + My_W z_W) \\ -My_W & Mx_W & 0 & -(J_{XZ} + Mx_W z_W) & -(J_{YZ} + My_W z_W) & J_{ZZ} + M(x_W^2 + y_W^2) \end{bmatrix}$$

In the formula, $J_{XX}$, $J_{YY}$, $J_{ZZ}$ are the moments of inertia of the vehicle around the x, y and z axises;

$J_{XY}$, $J_{YZ}$, $J_{XZ}$ are the products of inertia of the vehicle around the x/y, y/z and x/z axises.

$$[K_{6\times 6}] = \begin{bmatrix} 0 & 0 & 0 & 0 & 0 & 0 \\ 0 & 0 & 0 & 0 & 0 & 0 \\ 0 & 0 & \sum_{j=1}^{6} K_{Zj} & \sum_{j=1}^{6} K_{Zj} L_j & -\sum_{j=1}^{6} K_{Zj} b_j & 0 \\ 0 & 0 & \sum_{j=1}^{6} K_{Zj} L_j & \sum_{j=1}^{6} K_{Zj} L_j^2 & -\sum_{j=1}^{6} K_{Zj} L_j b_j & 0 \\ 0 & 0 & -\sum_{j=1}^{6} K_{Zj} b_j & -\sum_{j=1}^{6} K_{Zj} L_j b_j & \sum_{j=1}^{6} K_{Zj} b_j^2 & 0 \\ 0 & 0 & 0 & 0 & 0 & 0 \end{bmatrix}$$

In the formula, $K_{Zj}$ is a vertical comprehensive stiffness coefficient of a j-th suspension branch chain;

$b_j$ is x coordinate of the supporting point $Q_j$ on the suspension numbered j in the oxyz coordinate system;

$L_j$ is y coordinate of the supporting point $Q_j$ on the suspension numbered j in the oxyz coordinate system.

$$[C_{6\times6}] = \begin{bmatrix} 0 & 0 & 0 & 0 & 0 & 0 \\ 0 & 0 & 0 & 0 & 0 & 0 \\ 0 & 0 & \sum_{j=1}^{6}C_{Zj} & \sum_{j=1}^{6}C_{Zj}L_j & -\sum_{j=1}^{6}C_{Zj}b_j & 0 \\ 0 & 0 & \sum_{j=1}^{6}C_{Zj}L_j & \sum_{j=1}^{6}C_{Zj}L_j^2 & -\sum_{j=1}^{6}C_{Zj}L_jb_j & 0 \\ 0 & 0 & -\sum_{j=1}^{6}C_{Zj}b_j & -\sum_{j=1}^{6}C_{Zj}L_jb_j & \sum_{j=1}^{6}C_{Zj}b_j^2 & 0 \\ 0 & 0 & 0 & 0 & 0 & 0 \end{bmatrix}$$

In the formula, $C_{Zj}$ is a vertical comprehensive damping coefficient of a j-th suspension.

$$\{F_6\} = \begin{cases} \sum_{j=1}^{6}(P_j - F_j)\sin\theta_j + Mg\sin\lambda\cos\phi \\ \sum_{j=1}^{6}(P_j - F_j)\cos\theta_j + Mg\sin\lambda\sin\phi \\ \sum_{j=1}^{6}K_{Zj}(s_0 + s_j^R + \Delta_j) + \sum_{j=1}^{6}C_{Zj}(\dot{s}_j^R + \dot{\Delta}_j) - Mg\cos\lambda \\ \sum_{j=1}^{6}r(P_j - F_j)\cos\theta_j + \sum_{j=1}^{6}[K_{Zj}(s_0 + s_j^R + \Delta_j)L_j] + \\ \sum_{j=1}^{6}[C_{Zj}(\dot{s}_j^R + \dot{\Delta}_j)L_j] - Mg(z_M\sin\lambda\sin\phi + y_M\cos\lambda) \\ -\sum_{j=1}^{6}r(P_j - F_j)\sin\theta_j - \sum_{j=1}^{6}[K_{Zj}(s_0 + s_j^R + \Delta_j)b_j] - \\ \sum_{j=1}^{6}C_{Zj}(\dot{s}_j^R + \dot{\Delta}_j)b_j + Mg(z_M\sin\lambda\cos\phi + x_M\cos\lambda) \\ \sum_{j=1}^{6}(P_j - F_j)(b_j\cos\theta_j - L_j\sin\theta_j) - Mg(y_M\sin\lambda\cos\phi - x_M\sin\lambda\sin\phi) \end{cases}$$

In the formula, r is a free radius of wheel;

λ is a slope angle of the terrain ahead of the vehicle;

φ is an azimuth angle of the vehicle relative to the slope, that is, the included angle between the x axis of the vehicle coordinate system and the descending direction of the slope gradient;

$s_0$ is a vertical displacement of the center of mass of the passive suspension vehicle from a free state to a gravity equilibrium state in the horizontal plane;

$\Delta_j$ is a vertical displacement of the ground-contacted point of each wheel caused by road unevenness;

$\dot{\Delta}_j$ is a vertical speed of the ground-contacted point of each wheel caused by road unevenness;

$s_j^R$ is an output stroke of the active suspension relative to the passive suspension in a closed-loop control of actuator displacement, which is 0 in the passive suspension;

$\dot{s}_j^R$ is an output speed of the active suspension relative to the passive suspension in a closed-loop control of actuator displacement, which is 0 in the passive suspensions;

$P_j$ is a driving force of the j-th wheel;

$F_j$ is a braking force of the j-th wheel;

$\theta_j$ is a steering angle of the j-th wheel;

g is the acceleration of gravity.

(2) A Dynamics Solving Method

Taking a displacement vector of the vehicle coordinate system in the OXYZ coordinate system as:

$\{q_6\} = \{X, Y, Z, \alpha, \beta, \gamma\}^T$

Constructing a dynamics matrix based on the above kinematic differential equation as follows:

$\{\ddot{q}_6\} = [M_{6\times6}]^{-1}\{F_6\} - [M_{6\times6}]^{-1}[C_{6\times6}]\{\dot{q}_6\} - [M_{6\times6}]^{-1}[K_{6\times6}]\{q_6\}$ Setting a state variable as:

$$\{q_{12}\} = \begin{Bmatrix} \{q_6\} \\ \{\dot{q}_6\} \end{Bmatrix} = \{x \ y \ z \ \alpha \ \beta \ \gamma \ \dot{x} \ \dot{y} \ \dot{z} \ \dot{\alpha} \ \dot{\beta} \ \dot{\gamma}\}^T$$

Substituting the state variable into the dynamics matrix to obtain a state equation as follows:

$\{\dot{q}_{12}\} = [E]\{q_{12}\} + \{F^*\}$

Wherein, $$[E] = \begin{bmatrix} [0]_{6\times6} & [I]_{6\times6} \\ -[M_{6\times6}]^{-1}[K_{6\times6}] & -[M_{6\times6}]^{-1}[C_{6\times6}] \end{bmatrix}$$

$$\{F^*\} = \begin{Bmatrix} \{0\}^6 \\ [M_{6\times6}]^{-1}\{F_6\} \end{Bmatrix}$$

The above state equation can be solved by a fourth order Runge-Kutta method to obtain the value of the state variable $\{q_{12}\}$.

3. The inertial regulation method of active suspensions of the three-axle vehicle based on the terrain ahead of the vehicle comprises the following steps.

S1: calculating trajectories of the ground-contacted points of wheels and the elevation information of each ground-contacted point Based on the position coordinates $\{x, y, z, \alpha, \beta, \gamma\}^T$ of the vehicle coordinate system oxyz measured by the inertial measurement unit 5 and the two antennas 6-1 and 6-2 of the dual-antenna GPS positioning system in the fixed coordinate system OXYZ, the three-dimensional grid terrain ahead of the vehicle in the fixed coordinate system OXYZ obtained by the scanning of the laser radar 4 and coordinate transformation, and the vehicle steering angle measured by the steering wheel angle sensor 9 and the steering angles $\theta_1$, $\theta_2$, ..., $\theta_6$ of all wheels calculated according to the Ackermann steering principle, calculating, by the kinematics model, the trajectories of $T_1$, $T_2$, ..., $T_6$ of the ground-contacted points of all wheels 3-1, 3-2, ..., 3-6 when the vehicle drives on the terrain ahead of the vehicle. Due to the uneven slope, all the 6 trajectories of wheels are curves in space. On this basis, the interpolation algorithm can be used to calculate elevation information of the ground-contacted points $R_1$, $R_2$, ..., $R_6$ of all wheels in each scanning cycle.

S2: calculating a trajectory of center of mass and an attitude history when the vehicle passes through the terrain ahead of the vehicle with passive suspensions S21: taking the ground rolling friction coefficient f of the wheel determined by the geological conditions of the ground, the vehicle speed v measured by the vehicle speed sensor 7, steering angle θ measured by the steering wheel angle sensor 9 and the steering angles $\theta_1$, $\theta_2$, ..., $\theta_6$ of all wheels calculated according to the Ackermann principle, the driving forces of all wheels $P_1$, $P_2$, ..., $P_6$ measured by the gear position sensor 8 and the throttle opening degree sensor 10, the resultant force of the braking force and the rolling friction forces $F_1$, $F_2$, ..., $F_6$ of all wheels measured by the braking force sensor 11 as inputs, calculating, from the dynamics model of the passive suspension vehicle, the discrete points $\{q_{12}\}_i = \{X_i \ Y_i \ Z_i \ \alpha_i \ \beta_i \ \gamma_i \ \dot{X}_i \ \dot{Y}_i \ \dot{Z}_i \ \dot{\alpha}_i \ \dot{\beta}_i \ \dot{\gamma}_i\}^T$ of the trajectories when the vehicle drives along the trajectories $T_1, T_2, \ldots, T_6$ of the ground-contacted points of the wheels in S1, wherein i=0, 1, 2, . . . , n, and n is the number of planned data points. Based on $\{q_{12}\}_i$, calculating three coordinates related to the suspension characteristics in the trajectory history of the center of mass of the vehicle as follows:

$$\begin{cases} Z_{Wi} = Z + z_W + y_W\alpha_i - x_W\beta_i \\ \alpha_{Wi} = \alpha_i \\ \beta_{Wi} = \beta_i \end{cases}, i = 0, 1, 2, \ldots, n$$

S22: smoothing the driving trajectory of the vehicle

Performing smoothing crossing the start point on the three variables of $z_{Wi}$, $\alpha_{Wi}$, $\beta_{Wi}$ in the trajectory of center of mass and the attitude history of the passive suspension vehicle. The smoothing method in this embodiment uses least square polynomial fitting. Taking the smoothing method of $z_{Wi}$ as an example, the specific algorithm is as follows.

For a given data point $(t_i, z_{Wi})$, $t_i = i \times \Delta T$, i=0, 1, 2, . . . , n, and $\Delta T$ is a scanning cycle of the suspension control. A $\xi$-order polynomial can be used for fitting, in which $\xi$ is the order of the polynomial and can be gradually increased from small to large, and the initial value can be taken as 1.

$$z_W(t_i) = \sum_{k=0}^{\xi} a_k t_i^k$$

In the formula, k is the power of polynomial;
$\alpha_k$ is the polynomial coefficient;
$\xi$ is the order of polynomial.

This function reflects a change trend of the corresponding data, and it is expected that the sum of the squares of residuals at all data points is minimum. That is, $$K_0[z_w(t_0) - z_{w0}]^2 + \sum_{i=1}^{n} [z_W(t_i) - z_{wi}]^2 = \min$$

In order to make the polynomial function after fitting pass the start point, in the above formula, $[z_w(t_0)-z_{w0}]^2$ of is separately listed from the summing formula and multiplied by a larger coefficient $K_0$ to increase the weight of the start point of data. In practical application, a large enough $K_0$ can be taken according to the number of planning data points to make the polynomial function after fitting as close as possible to the start point, so as to meet the accuracy requirements expected by the designer.

Solving the partial derivative of the above formula with respect to $a_0, \ldots, a_k$, so that a $\xi$ order equation set with respect to $a_0, \ldots, a_k$ can be obtained, and the values of $a_0, \ldots, a_k$ can be calculated through the Cramer rule.

S3: based on the smooth-processed trajectory of the center of mass and attitude history, calculating the suspension stroke history $s_{ij}$ and suspension supporting force history $W_{ij}$ when the vehicle passes through the terrain ahead of the vehicle with the active suspensions.

S31: taking the smooth-processed center of mass trajectory and attitude history of the vehicle in step S22 as inputs to calculate the stroke history $s_{i,j}^R$ and speed history $\dot{s}_{i,j}^R$ of each suspension relative to the passive suspension when the vehicle passes through the terrain ahead of the vehicle with the active suspensions, wherein the specific steps are as follows.

(1) based on the 6-dimensional coordinate history $\{X_i, Y_i, Z_i, \alpha_i, \beta_i, \gamma_i\}^T$ of the vehicle coordinate system when the vehicle passes through the terrain ahead of the vehicle with the passive suspensions obtained in S21, solving a vertical displacement history of supporting points $Q_1, Q_2, \ldots, Q_6$ on all suspensions by the following formula:

$$w_{i,j}^P = Z_i - b_j\beta_i + L_j\alpha_i, i=0,1,2,\ldots,n; j=1,2,\ldots,6$$

then a vertical speed history of the supporting points $Q_1, Q_2, \ldots, Q_6$ on all suspensions is:

$$\dot{w}_{i,j}^P = \dot{Z}_i - b_j\dot{\beta}_i + L_j\dot{\alpha}_i, i=0,1,2,\ldots,n; j=1,2,\ldots,6$$

(2) according to the function $\{X_W(t_i), Y_W(t_i), Z_W(t_i), \alpha_W(t_i), \beta_W(t_i), \gamma_W(t_i)\}^T$ of the center of mass trajectory and attitude history after smoothing in S22, inversely calculating the three relative coordinate time histories of the vehicle coordinate system relative to the fixed coordinate system as follows:

$$\begin{cases} Z(t_i) = Z_W(t_i) - z_W - y_W\alpha(t_i) - x_W\beta \\ (t_i)\alpha_{Wi} = \alpha_i \\ \beta_{Wi} = \beta_i \end{cases}, i = 0, 1, 2, \ldots, n$$

then solving a vertical displacement of the supporting points $Q_1, Q_2, \ldots, Q_6$ of all suspensions from $z(t_i)$, $\alpha(t_i)$, $\beta(t_i)$ as follows:

$$w_{i,j}^A = Z_j(t_i) - b_j\beta(t_i) + L_j\alpha(t_i), i=0,1,2,\ldots,n; j=1,2,\ldots,m$$

A vertical speed of the supporting points $Q_1, Q_2, \ldots, Q_6$ on all suspensions is:

$$\dot{w}_{i,j}^A = \dot{Z}_j(t_i) - b_j\dot{\beta}(t_i) + L_j\dot{\alpha}(t_i), i=0,1,2,\ldots,n; j=1,2,\ldots,m$$

(3) calculating the stroke history $s_{i,j}^R$ and speed history $\dot{s}_{i,j}^R$ of each active suspension relative to the passive suspension the stroke history of each active suspension relative to the passive suspension is equal to the difference between the vertical displacement $w_{i,j}$ history $w_{i,j}$ of the supporting points on each active suspension after the smoothing process and the vertical displacement history $w_{i,j}^P$ of the supporting points on the passive suspension before the smoothing process:

$$s_{i,j} = w_{i,j} - w_{i,j}^P, i=0,1,2,\ldots,n; j=1,2,\ldots,6$$

the speed history of each active suspension relative to the passive suspension is equal to the difference between the vertical speed history $\dot{w}_{i,j}$ of the supporting points on each active suspension after the smoothing process and $\dot{w}_{i,j}^P$ the vertical speed history $\dot{w}_{i,j}^P$ of the supporting points on the passive suspension before the smoothing process:

$$\dot{s}_{i,j} = \dot{w}_{i,j} - \dot{w}_{i,j}^P, i=0,1,2,\ldots,n; j=1,2,\ldots,6.$$

S32: the specific steps of calculating, from a dynamics model of the vehicle, a stroke history $s_{i,j}$ and a supporting force history $W_{i,j}$ of each suspension of the vehicle when the vehicle passes through the terrain ahead of the vehicle with the active suspensions are as follows:

(1) solving the vertical displacement history $w'_{i,j}$ and vertical speed history $\dot{w}'_{i,j}$ of the supporting points on each active suspension, wherein according to stroke difference history $s_{i,j}^R$ and speed difference history $\dot{s}_{i,j}^R$ of the active/passive suspension, solving, from the dynamics model of the vehicle, a new state variable $\{q'_{12}\}_i$ when the vehicle passes through the terrain ahead of the vehicle, where i=0, 1, 2, . . . , n. Substituting the displacement variables $z'_i$, $\alpha'_i$, $\beta'_i$, into the following formula to calculate the vertical displacement history of the supporting points $Q_1$, $Q_2$, . . . , $Q_6$ on all suspensions as follows:

$$w'_{i,j}=z'_i-b_j\beta'_i+L_j\alpha'_i, i=0,1,2,\ldots,n; j=1,2,\ldots,6$$

Substituting the values of speed variables $\dot{z}'_i$, $\dot{\alpha}'_i$, $\dot{\beta}'_i$ into the following formula to calculate the vertical speed history of the supporting points $Q_1$, $Q_2$, . . . , $Q_6$ on all suspensions as follows:

$$\dot{w}'_{i,j}=\dot{z}'_i-b_j\dot{\beta}'_i+L_j\dot{\alpha}'_i, i=0,1,2,\ldots,n; j=1,2,\ldots,6$$

(2) solving the stroke history $s_{i,j}$ of each active suspension relative to the median position, wherein because the vertical deformation of the tire is far less than the stroke of the active suspension, the vertical deformation of the tire is omitted; the vertical deformation of the tire is compensated in a suspension impedance control in S4. The stroke history of each active suspension relative to the median position is equal to the difference between the vertical displacement history $w'_{i,j}$ of the supporting points $Q_1$, $Q_2$, . . . , $Q_6$ on all suspensions and the vertical displacement history $\Delta_{i,j}$ of ground-contacted points of all wheels $R_1$, $R_2$, . . . , $R_6$.

$$s_{i,j}=w_{i,j}-w_{i,j}^P, i=0,1,2,\ldots,n; j=1,2,\ldots,6$$

(3) calculating the supporting force history $W_{ij}$ of each active suspension the supporting force history of each active suspension of the vehicle is as follows:

$$W_{i,j}=K_{jZ}(w'_{i,j}-s_0-s_{i,j}^R-\Delta_{i,j})+C_{jZ}(\dot{w}'_{i,j}-\dot{s}_{i,j}^R-\dot{\Delta}_{i,j}), i=0,1,2,\ldots,n; j=1,2,\ldots,6$$

In the formula, $\Delta_{i,j}$ and $\dot{\Delta}_{i,j}$ are respectively the vertical displacement history and speed history of the ground-contacted points $R_1$, $R_2$, . . . , $R_6$ of all wheels.

S4: the specific realization method of performing an impedance control based on force-displacement on a suspension actuator is as follows:

① solving the displacement control quantity of suspension impedance control

Setting the measured value of the current supporting forces of suspensions as $W_{i,j}^c$, which can be measured by the supporting force sensors 13-1, 13-2, . . . , 13-6 installed on the suspension cylinder. According to a simplified model of the contact force between the wheel and the ground, the expected stroke increment $\delta_{i,j}$ of the suspension can be obtained as:

$$\delta_{i,j}=\frac{\Delta W_{i,j}}{K}=i=0,1,2,\ldots,n; j=1,2,\ldots,6$$

In the formula, $\Delta W_{i,j}=W_{i,j}-W_{i,j}^c$; K is the contact stiffness between the wheel and the ground.

Then the target displacement of each active suspension is:

$$s_{i,j}^d=s_{i,j}+\delta_{i,j}, i=0,1,2,\ldots,n; j=1,2,\ldots,6$$

② verifying whether the strokes $s_{i,j}^d$ of all suspensions in the whole history exceeds the limit of stroke The verification formula is:

$$s_{min}\leq s_{i,j}^d\leq s_{max}, i=0,1,2,\ldots,n; j=1,2,\ldots,6$$

in the formula, $s_{min}$ is a lower limit displacement of the suspension;

$s_{max}$ is an upper limit displacement of the suspension.

If there is a suspension which exceeds the limit stroke, the smoothness of a vehicle trajectory curve is reduced first, and the corresponding smoothness coefficient $\xi$ is adjusted, it is handled according to the following two cases respectively:

(1) if the smoothness coefficient $\xi$ has not reached a preset smoothness coefficient limit value, then proceeding to step S22.

(2) if the smoothness coefficient $\xi$ has reached the limit value and it still cannot meet the condition that each suspension stroke in the whole history does not exceed the limit stroke, finding a first data point with the suspension stroke exceeding the limit stroke according to the time sequence of occurrence, and setting the number of planned data point in step S2 as $i_E(1\leq i_E\leq n)$, then letting $n=i_E$ and returning to step S21.

Each suspension stroke in the whole history is made no more than the limit stroke through the above processing.

S4: performing PID displacement control on the active suspension

Setting the measured value of the suspension relative to the median position stroke as $s_{i,j}^c$, which can be measured by the stroke sensors 12-1, 12-2, . . . , 12-6 installed on the suspension cylinder; and according to the target strokes $s_{i,j}^d$ of all suspensions after the verification, comparing the target strokes with the measured suspension strokes $s_{i,j}^c$, and performing the PID control on the strokes of the active suspensions.

The above embodiments are only to describe the preferred implementations of the present invention, not to limit the scope of the present invention. On the premise of not deviating from the design spirit of the present invention, various kinds of deformations and improvements of the technical solution of the present invention made by an ordinary person skilled in the art shall fall into the protection scope determined by the claims of the present invention.

What is claimed is:

1. An inertial regulation method of active suspensions based on terrain ahead of a vehicle, comprising the following steps:

S1: calculating trajectories of ground-contacted points of wheels and elevation information of ground-contacted point of each wheel when the vehicle passes through the terrain ahead of the vehicle;

according to position coordinates of the vehicle in a geodetic coordinate system measured by an inertial measurement unit and a dual-antenna GPS positioning system, and the terrain ahead of the vehicle scanned by a laser radar and a steering angle of each wheel, calculating, by vehicle kinematics, the trajectories $T_1$, $T_2$, . . . , $T_m$ of all ground-contacted points of wheels when the vehicle is driving on the terrain ahead of the vehicle, wherein j=1, 2, . . . , m, and m is a number of wheels; and calculating the elevation information of each planning data point on the trajectory of ground-contacted point of each wheel by an interpolation algorithm;

S2: calculating a trajectory of center of mass and an attitude history when the vehicle passes through the terrain ahead of the vehicle with passive suspensions;

S21: according to a vehicle speed, a steering angle, a driving/braking force of each wheel and a rolling friction coefficient of the wheel on the ground, calculating, from a vehicle dynamics model, a 6-dimensional coordinate history $\{X_i\ Y_i\ Z_i\ \alpha_i\ \beta_i\ \gamma_i\}$ of a vehicle coordinate system, the trajectory of center of mass and the attitude history $\{X_{Wi}\ Y_{Wi}\ Z_{Wi}\ \alpha_{Wi}\ \beta_{Wi}\ \gamma_{Wi}\}^T$ when the vehicle drives with the passive suspensions along the trajectories $T_1, T_2, \ldots, T_m$ of the ground-contacted points of wheels in step S1, wherein, $X_{Wi}, Y_{Wi}, Z_{Wi}, \alpha_{Wi}, \beta_{Wi}, \gamma_{Wi}$, are three-dimensional coordinates and three-dimensional attitude angles of the center of mass of the vehicle respectively, wherein i=0, 1, 2, ..., n, and n is the number of planned data points;

S22: taking a smoothness coefficient as $\xi$, performing a smoothing process crossing a start point on the trajectory of the center of mass and attitude history of the passive suspension vehicle in step S21 to obtain a smoothing function $\{X_W(t_i), Y_W(t_i), Z_W(t_i), \alpha_W(t_i), \beta_W(t_i), \gamma_W(t_i)\}^T$ of the trajectory of the center of mass and attitude history;

S3: based on the above-mentioned smooth-processed trajectory of the center of mass and attitude history, calculating the suspension stroke history $s_{i,j}$ and suspension supporting force history $W_{ij}$ when the vehicle passes through the terrain ahead of the vehicle with the active suspensions;

S31: taking the smooth-processed center of mass trajectory and attitude history of the vehicle in step S22 as inputs to calculate the stroke history $s_{i,j}{}^R$ and speed history $\dot{s}_{i,j}{}^R$ of each suspension relative to the passive suspension when the vehicle passes through the terrain ahead of the vehicle with the active suspensions, wherein j=1, 2, ..., m, and m is the number of wheels;

S32: under the conditions of the same speed of vehicle, steering angle, driving/braking force of each wheel and rolling friction coefficient of the wheel on the ground as in step S21, according to the stroke history $s_{i,j}{}^R$ and speed history $\dot{s}_{i,j}{}^R$ of active suspension relative to passive suspension obtained in step S31, calculating, from a dynamics model, a stroke history $s_{i,j}$ and a supporting force history $W_{ij}$ of each suspension relative to the median position when the vehicle passes through the terrain ahead of the vehicle with the active suspensions;

S4: according to the stroke history $s_{i,j}$ and the supporting force history $W_{ij}$ of each suspension relative to the median position when the vehicle passes through the terrain ahead of the vehicle with the active suspensions, performing an impedance control based on force-displacement on a suspension actuator;

in the steps S21 and S32, the vehicle dynamics model and solving thereof are as follows:

establishing a fixed coordinate system OXYZ, which is fixedly connected with the ground, wherein the coordinate system takes a reference point O of the inertial measurement unit as the origin of coordinates, the front of the vehicle as a positive direction of Y axis, the right direction of the vehicle as a positive direction of X axis, and the upward direction perpendicular to the XOY plane as a positive direction of Z axis; in order to determine the position of the vehicle in the fixed coordinate system, introducing a vehicle coordinate system oxyz, which is fixedly connected with a vehicle body, wherein the vehicle coordinate system coincides with the fixed coordinate system at an initial position, and positioning coordinates in the fixed coordinate system are X, Y, Z, $\alpha$, $\beta$, $\gamma$ respectively;

in order to improve a calculation speed, regarding the vehicle as a rigid body, setting the weight thereof as M and the coordinate thereof in the vehicle coordinate system as W $(x_W, y_W, z_W)$, wherein the vehicle has m wheels and has m corresponding suspensions, the active suspension is simplified to a parallel connection of an actuator, a spring and a damper; setting the control method of active suspension as a displacement control; setting the stiffness coefficients of suspension springs respectively as $K_{S1}, K_{S2}, \ldots, K_{Sm}$, and the damping coefficients of suspension dampers respectively as $C_{S1}, C_{S2}, C_{Sm}$; simplifying a tire as a parallel connection of a vertical spring and a damper, and ignoring the influence of lateral and tangential elasticity and damping of the tire on vehicle dynamics characteristics; setting the stiffness coefficients of vertical springs of all tires as $K_{W1}, K_{W2}, \ldots, K_{Wm}$, and setting the damping coefficients of vertical dampers of all tires as $C_{W1}, C_{W2}, \ldots, C_{Wm}$; setting the above-mentioned dampers to be viscous dampers; and setting the above-mentioned springs as nonlinear springs and approximating the springs by piecewise linear;

wherein the above is the dynamics model of the active suspension vehicle, which has 6 degrees of freedom; if the actuator in each suspension is removed, the above-mentioned dynamics model becomes the dynamics model of the passive suspension vehicle; when the suspension spring and damper are not provided in the design of partial active suspension, the suspension spring and damper in the above dynamics model of the active suspension vehicle should be omitted;

establishing a kinematic differential equation of the vehicle dynamics model by a Lagrange equation, which is expressed by matrix as follows:

$$[M_{6\times 6}]\{\ddot{q}_6\}+[C_{6\times 6}]\{\dot{q}_6\}+[K_{6\times 6}]\{q_6\}=\{F_6\}$$

in the formula, $[M_{6\times 6}]$, $[C_{6\times 6}]$ and $[K_{6\times 6}]$ are a weight matrix, a damping matrix and a stiffness matrix respectively, all of which are 6×6 symmetric square matrices; and $\{F_6\}$ is a force matrix which is a 6×1 array;

taking a displacement vector of the vehicle in the fixed coordinate system as:

$$\{q_6\}=\{X,Y,Z,\alpha,\beta,\gamma\}^T$$

constructing a dynamics matrix based on the above kinematic differential equation as follows:

$$\{\ddot{q}_6\}=[M_{6\times 6}]^{-1}\{F_6\}-[M_{6\times 6}]^{-1}[C_{6\times 6}]\{\dot{q}_6\}-[M_{6\times 6}]^{-1}[K_{6\times 6}]\{q_6\}$$

setting a state variable as:

$$\{q_{12}\} = \left\{\begin{matrix}\{q_6\}\\ \{\dot{q}_6\}\end{matrix}\right\} = \{X \; Y \; Z \; \alpha \; \beta \; \gamma \; \dot{X} \; \dot{Y} \; \dot{Z} \; \dot{\alpha} \; \dot{\beta} \; \dot{\gamma}\}^T$$

substituting the state variable into the dynamics matrix to obtain a state equation as follows:

$$\{\dot{q}_{12}\} = [E]\{q_{12}\} + \{F^*\}$$

wherein, $$[E] = \begin{bmatrix} [0]_{6\times 6} & [I]_{6\times 6} \\ -[M_{6\times 6}]^{-1}[K_{6\times 6}] & -[M_{6\times 6}]^{-1}[C_{6\times 6}] \end{bmatrix},$$

$$\{F^*\} = \left\{\begin{matrix}\{0\}_6\\ [M_{6\times 6}]^{-1}\{F_6\}\end{matrix}\right\}$$

the above state equation can be solved by a fourth order Runge-Kutta method to obtain the value of the state variable $\{q_{12}\}$.

2. The inertial regulation method according to claim 1, wherein in the step S21, a specific method of calculating a trajectory of center of mass and an attitude history when the vehicle passes through the terrain ahead of the vehicle with passive suspensions is as follows:

calculating three coordinates related to the suspension characteristics in the vehicle trajectory history by a time point $\{q_{12}\}_i$, calculated from the dynamics model, at which the vehicle passes through the terrain ahead of the vehicle with the passive suspensions as follows:

$$\begin{cases} Z_{W_i} = Z + z_W + y_W \alpha_i - x_W \beta_i \\ \alpha_{W_i} = \alpha_i \\ \beta_{W_i} = \beta_i \end{cases}, i = 0, 1, 2, \ldots, n$$

the above formula is obtained by assuming that $\alpha$ and $\beta$ are tiny variables, taking $\cos\alpha \approx 1$, $\cos\beta \approx 1$, $\sin\alpha \approx \alpha$, $\sin\beta \approx \beta$, and ignoring deformation of the vehicle body.

3. A control system applying the inertial regulation method of active suspensions based on terrain ahead of a vehicle according to claim 2, wherein the system comprises a vehicle body and m wheels, a laser radar, an inertial measurement unit, a dual antenna GPS positioning system, the suspension cylinders corresponding to the wheels, displacement sensors, supporting force sensors and a servo controller group thereof, a vehicle speed sensor, a steering wheel angle sensor, a throttle opening degree sensor, a braking force sensor, an electronic control unit, wherein the laser radar, the inertial measurement unit, the dual-antenna GPS positioning system, the electronic control unit and the servo controller group are fixed on the vehicle body, and the laser radar is installed on the front of the vehicle body for measuring the terrain ahead of the vehicle, and the two antennas of the dual antenna GPS positioning system are separated by a certain distance in space; the wheel is connected to the vehicle body through the suspension cylinder, and the displacement sensor and the supporting force sensor are installed on the suspension cylinder for measuring the stroke and supporting force of the suspension cylinder; the steering wheel angle sensor, the throttle opening degree sensor and the braking force sensor are used to measure a steering angle, a throttle opening degree and a braking strength; the electronic control unit respectively communicates with the inertial measurement unit, the laser radar, the dual antenna GPS positioning system, the steering wheel angle sensor, the throttle opening degree sensor, the braking force sensor, and the servo controller group, and the servo controller group communicates with the displacement sensor and supporting force sensor of the suspension cylinder.

4. The inertial regulation method according to claim 1, wherein in the step S31, specific steps of calculating the stroke history $s_{i,j}^R$ and speed history $\dot{s}_{i,j}^R$ of each suspension relative to the passive suspension when the vehicle passes through the terrain ahead of the vehicle with the active suspensions are as follows:

(1) based on the 6-dimensional coordinate history $\{X_i\ Y_i\ Z_i\ \alpha_i\ \beta_i\ \gamma_i\}^T$ of the vehicle coordinate system when the vehicle passes through the terrain ahead of the vehicle with the passive suspensions obtained in S21, solving a vertical displacement history of supporting points $Q_1$, $Q_2$, ..., $Q_m$ on all suspensions by the following formula:

$$w_{i,j}^P = Z_i - b_j\beta_i + L_j\alpha_i, i=0,1,2,\ldots,m$$

in the formula, $b_j$ is x coordinate of the supporting point on the suspension numbered j in the oxyz coordinate system;

$L_j$ is y coordinate of the supporting point on the suspension numbered j in the oxyz coordinate system;

then a vertical speed history of the supporting points $Q_1$, $Q_2$, ..., $Q_m$ on all suspensions is:

$$\dot{w}_{i,j}^P = \dot{Z}_i - b_j\dot{\beta}_i + L_j\dot{\alpha}_i, i=0,1,2,\ldots,m$$

(2) according to the function $\{X_W(t_i), Y_W(t_i), Z_W(t_i), \alpha_W(t_i), \beta_W(t_i), \gamma_W(t_i)\}^T$ of the center of mass trajectory and attitude history obtained after smoothing process in S22, inversely calculating a time history function of the three coordinates of the vehicle coordinate system relative to the fixed coordinate system as follows:

$$\begin{cases} Z(t_i) = Z_W(t_i) - z_W - y_W\alpha(t_i) + x_W\beta(t_i) \\ \alpha(t_i) = \alpha_W(t_i) \\ \beta(t_i) = \beta_W(t_i) \end{cases}, i = 0, 1, 2, \ldots, n$$

then solving a vertical displacement of the supporting points $Q_1$, $Q_2$, ..., $Q_m$ on all suspensions from $z(t_i)$, $\alpha(t_i)$, $\beta(t_i)$ as follows:

$$w_{i,j}^A = Z_j(t_i) - b_j\beta(t_i) + L_j\alpha(t_i), i=0,1,2,\ldots,m$$

a vertical speed of the supporting points $Q_1$, $Q_2$, ..., $Q_m$ on all suspensions is:

$$\dot{w}_{i,j}^A = \dot{Z}_j(t_i) - b_j\dot{\beta}(t_i) + L_j\dot{\alpha}(t_i), i=0,1,2,\ldots,m$$

(3) calculating the stroke history $s_{i,j}^R$ and speed history $\dot{s}_{i,j}^R$ of each active suspension relative to the passive suspension the stroke history of each active suspension relative to the passive suspension is equal to the difference between the vertical displacement $w_{i,j}$ history $w_{i,j}$ of the supporting points on each active suspension after the smoothing process and the vertical displacement history $w_{i,j}^P$ of the supporting points on the passive suspension before the smoothing process:

$$s_{i,j} = w_{i,j} - w_{i,j}^P, i=0,1,2,\ldots,n; j=1,2,\ldots,m$$

the speed history of each active suspension relative to the passive suspension is equal to the difference between the vertical speed history $\dot{w}_{i,j}$ of the supporting points on each active suspension after the smoothing process and $\dot{w}_{i,j}^P$ the vertical speed history $\dot{w}_{i,j}^P$ of the supporting points on the passive suspension before the smoothing process:

$$\dot{s}_{i,j} = \dot{w}_{i,j} - \dot{w}_{i,j}^P, i=0,1,2,\ldots,n; j=1,2,\ldots,m.$$

5. A control system applying the inertial regulation method of active suspensions based on terrain ahead of a vehicle according to claim 4, wherein the system comprises a vehicle body and m wheels, a laser radar, an inertial measurement unit, a dual antenna GPS positioning system, the suspension cylinders corresponding to the wheels, displacement sensors, supporting force sensors and a servo controller group thereof, a vehicle speed sensor, a steering wheel angle sensor, a throttle opening degree sensor, a braking force sensor, an electronic control unit, wherein the laser radar, the inertial measurement unit, the dual-antenna GPS positioning system, the electronic control unit and the servo controller group are fixed on the vehicle body, and the laser radar is installed on the front of the vehicle body for measuring the terrain ahead of the vehicle, and the two antennas of the dual antenna GPS positioning system are separated by a certain distance in space; the wheel is connected to the vehicle body through the suspension cylinder, and the displacement sensor and the supporting force sensor are installed on the suspension cylinder for measuring the stroke and supporting force of the suspension cylinder; the steering wheel angle sensor, the throttle opening degree sensor and the braking force sensor are used to measure a steering angle, a throttle opening degree and a braking strength; the electronic control unit respectively communicates with the inertial measurement unit, the laser radar, the dual antenna GPS positioning system, the steering wheel angle sensor, the throttle opening degree sensor, the braking force sensor, and the servo controller group, and the servo controller group communicates with the displacement sensor and supporting force sensor of the suspension cylinder.

6. The inertial regulation method according to claim 1, wherein the specific steps of calculating, from a dynamics model of the vehicle, a stroke history $s_{i,j}$ and a supporting force history Wij of each suspension of the vehicle when the vehicle passes through the terrain ahead of the vehicle with the active suspensions in step S32 are as follows:

(1) solving the vertical displacement history $w'_{i,j}$ and vertical speed history $\dot{w}'_{i,j}$ of the supporting points on each active suspension,
wherein according to stroke difference history $s_{i,j}^R$ and speed difference history $\dot{s}_{i,j}^R$ of the active/passive suspension, solving, from the dynamics model of the vehicle, a new state variable $\{q'_{12}\}_i$ when the vehicle passes through the terrain ahead of the vehicle, and substituting displacement variables $z'_i, \alpha'_i, \beta'_i$ contained in the new state variable into the following formula to calculate the vertical displacement history of the supporting points $Q_1, Q_2, \ldots, Q_m$ on each suspension:

$$w'_{i,j} = z'_i - b_j \beta'_i + L_j \alpha'_i, i=0,1,2,\ldots,n; j=1,2,\ldots,m$$

substituting the values of speed variables $\dot{z}'_i, \dot{\alpha}'_i, \dot{\beta}'_i$ into the following formula to calculate the vertical speed history of the supporting points $Q_1, Q_2, \ldots, Q_m$ on all suspensions as follows:

$$\dot{w}'_{i,j} = \dot{z}'_i - b_j \dot{\beta}'_i + L_j \dot{\alpha}'_i, i=0,1,2,\ldots,n; j=1,2,\ldots,m$$

(2) solving the stroke history $s_{i,j}$ of each active suspension relative to the median position, wherein because the vertical deformation of the tire is far less than the stroke of the active suspension, the vertical deformation of the tire is omitted; the vertical deformation of the tire is compensated in a suspension impedance control in S4; the stroke history of each active suspension relative to the median position is equal to the difference between the vertical displacement history $w'_{i,j}$ of the supporting points $Q_1, Q_2, \ldots, Q_m$ on all suspensions and the vertical displacement history $\Delta_{i,j}$ of ground-contacted points of all wheels $R_1, R_2, \ldots, R_m$:

$$s_{i,j} = w_{i,j} - w_{i,j}^P, i=0,1,2,\ldots,n; j=1,2,\ldots,m$$

(3) calculating the supporting force history $W_{i,j}$ of each active suspension,
wherein the supporting force history of each active suspension of the vehicle is as follows:

$$W_{i,j} = K_{jz}(w'_{i,j} - s_0 - s_{i,j}^R - \Delta_{i,j}) + C_{jz}(\dot{w}'_{i,j} - \dot{s}_{i,j}^R - \dot{\Delta}_{i,j}), i=0,1,2,\ldots,n; j=1,2,\ldots,m$$

in the formula, $\Delta_{i,j}$ and $\dot{\Delta}_{i,j}$ are respectively the vertical displacement history and speed history of the ground-contacted point of wheel.

7. A control system applying the inertial regulation method of active suspensions based on terrain ahead of a vehicle according to claim 6, wherein the system comprises a vehicle body and m wheels, a laser radar, an inertial measurement unit, a dual antenna GPS positioning system, the suspension cylinders corresponding to the wheels, displacement sensors, supporting force sensors and a servo controller group thereof, a vehicle speed sensor, a steering wheel angle sensor, a throttle opening degree sensor, a braking force sensor, an electronic control unit, wherein the laser radar, the inertial measurement unit, the dual-antenna GPS positioning system, the electronic control unit and the servo controller group are fixed on the vehicle body, and the laser radar is installed on the front of the vehicle body for measuring the terrain ahead of the vehicle, and the two antennas of the dual antenna GPS positioning system are separated by a certain distance in space; the wheel is connected to the vehicle body through the suspension cylinder, and the displacement sensor and the supporting force sensor are installed on the suspension cylinder for measuring the stroke and supporting force of the suspension cylinder; the steering wheel angle sensor, the throttle opening degree sensor and the braking force sensor are used to measure a steering angle, a throttle opening degree and a braking strength; the electronic control unit respectively communicates with the inertial measurement unit, the laser radar, the dual antenna GPS positioning system, the steering wheel angle sensor, the throttle opening degree sensor, the braking force sensor, and the servo controller group, and the servo controller group communicates with the displacement sensor and supporting force sensor of the suspension cylinder.

8. The inertial regulation method according to claim 1, wherein the specific realization method of performing an impedance control based on force-displacement on a suspension actuator in the S4 is as follows:

① solving the displacement control quantity of suspension impedance control
setting the measured value of the current suspension supporting force as $W_{i,j}^c$, and using the following formula to express the relationship between the difference between a theoretical supporting force and an actual supporting force of the suspension and an expected suspension stroke increment $\delta_{i,j}$:

$$\Delta W_{i,j} = W_{i,j} - W_{i,j}^c = M\ddot{\delta}_{i,j} + C\dot{\delta}_{i,j} + K\delta_{i,j}, i=0,1,2,\ldots,n; j=1,2,\ldots,m$$

in the formula, M, K and C are target inertia, target stiffness and target damping respectively and reflect the inertia characteristics of spring weight, stiffness characteristics and damping characteristics of tire contacting the ground respectively; the above differential equation can be solved by means of convolution integral:

$$\delta_{i,j} = \int_0^t \Delta W_{i,j}(\tau) h_{i,j}(t-\tau) d\tau, i=0,1,2,\ldots,n; j=1,2,\ldots,m$$

the function $h_{i,j}(t)$ in the above formula is the corresponding unit impulse response function of the previous formula;
the above formula can be solved by an FFT algorithm; in actual control, since the moving speed and acceleration of each suspension stroke increment $\delta_{i,j}$ of the vehicle are relatively small, it can be considered that $\ddot{\delta}_{i,j} \approx \dot{\delta}_{i,j} \approx 0$ and then a contact force model between the wheel and the ground can be simplified as:

$$\delta_{i,j} = \frac{\Delta W_{i,j}}{K}, i=0,1,2,\ldots,n; j=1,2,\ldots,m$$

② impedance control of active suspensions based on force-displacement
setting the measured value of the suspension relative to the median position stroke as $s_{i,j}^c$, and designing a disturbance self-rejection controller by taking $l_d=l_z+\Delta l_z$ $s_{i,j}{}^d=s_{i,j}+\delta_{i,j}$ as a target stroke, so as to realize displacement follow-up control of each suspension actuator.

9. A control system applying the inertial regulation method of active suspensions based on terrain ahead of a vehicle according to claim 8, wherein the system comprises a vehicle body and m wheels, a laser radar, an inertial measurement unit, a dual antenna GPS positioning system, the suspension cylinders corresponding to the wheels, displacement sensors, supporting force sensors and a servo controller group thereof, a vehicle speed sensor, a steering wheel angle sensor, a throttle opening degree sensor, a braking force sensor, an electronic control unit, wherein the laser radar, the inertial measurement unit, the dual-antenna GPS positioning system, the electronic control unit and the servo controller group are fixed on the vehicle body, and the laser radar is installed on the front of the vehicle body for measuring the terrain ahead of the vehicle, and the two antennas of the dual antenna GPS positioning system are separated by a certain distance in space; the wheel is connected to the vehicle body through the suspension cylinder, and the displacement sensor and the supporting force sensor are installed on the suspension cylinder for measuring the stroke and supporting force of the suspension cylinder; the steering wheel angle sensor, the throttle opening degree sensor and the braking force sensor are used to measure a steering angle, a throttle opening degree and a braking strength; the electronic control unit respectively communicates with the inertial measurement unit, the laser radar, the dual antenna GPS positioning system, the steering wheel angle sensor, the throttle opening degree sensor, the braking force sensor, and the servo controller group, and the servo controller group communicates with the displacement sensor and supporting force sensor of the suspension cylinder.

10. The inertial regulation method according to claim 1, wherein, the S4 further comprises a content for verifying whether the suspension stroke $s_{i,j}{}^d$ in the whole history exceeds the limit stroke before the implementation of impedance control based on the force-displacement;

the verification formula is:

$$s_{min} \le s_{i,j}{}^d \le s_{max}, i=1,2,\ldots,n, j=1,2,\ldots,m$$

in the formula, $s_{min}$ is a lower limit displacement of the suspension;

$s_{max}$ is an upper limit displacement of the suspension;

if there is a certain suspension stroke exceeding the limit stroke, the smoothness of a vehicle trajectory curve is reduced first, and the corresponding smoothness coefficient $\xi$ is adjusted, it is handled according to the following two cases respectively:

(1) if the smoothness coefficient $\xi$ has not reached a preset smoothness coefficient limit value, then proceeding to step S22;

(2) if the smoothness coefficient $\xi$ has reached the limit value and it still cannot meet the condition that each suspension stroke in the whole history does not exceed the limit stroke, finding a first data point with the suspension stroke exceeding the limit stroke according to the time sequence of occurrence, and setting the number of planned data point in step S2 as $i_E(1 \le i_E \le n)$, then letting $n=i_E$ and returning to step S21, wherein each suspension stroke in the whole history is made no more than the limit stroke through the above processing.

11. A control system applying the inertial regulation method of active suspensions based on terrain ahead of a vehicle according to claim 10, wherein the system comprises a vehicle body and m wheels, a laser radar, an inertial measurement unit, a dual antenna GPS positioning system, the suspension cylinders corresponding to the wheels, displacement sensors, supporting force sensors and a servo controller group thereof, a vehicle speed sensor, a steering wheel angle sensor, a throttle opening degree sensor, a braking force sensor, an electronic control unit, wherein the laser radar, the inertial measurement unit, the dual-antenna GPS positioning system, the electronic control unit and the servo controller group are fixed on the vehicle body, and the laser radar is installed on the front of the vehicle body for measuring the terrain ahead of the vehicle, and the two antennas of the dual antenna GPS positioning system are separated by a certain distance in space; the wheel is connected to the vehicle body through the suspension cylinder, and the displacement sensor and the supporting force sensor are installed on the suspension cylinder for measuring the stroke and supporting force of the suspension cylinder; the steering wheel angle sensor, the throttle opening degree sensor and the braking force sensor are used to measure a steering angle, a throttle opening degree and a braking strength; the electronic control unit respectively communicates with the inertial measurement unit, the laser radar, the dual antenna GPS positioning system, the steering wheel angle sensor, the throttle opening degree sensor, the braking force sensor, and the servo controller group, and the servo controller group communicates with the displacement sensor and supporting force sensor of the suspension cylinder.

12. A control system applying the inertial regulation method of active suspensions based on terrain ahead of a vehicle according to claim 1, wherein the system comprises a vehicle body and m wheels, a laser radar, an inertial measurement unit, a dual antenna GPS positioning system, the suspension cylinders corresponding to the wheels, displacement sensors, supporting force sensors and a servo controller group thereof, a vehicle speed sensor, a steering wheel angle sensor, a throttle opening degree sensor, a braking force sensor, an electronic control unit, wherein the laser radar, the inertial measurement unit, the dual-antenna GPS positioning system, the electronic control unit and the servo controller group are fixed on the vehicle body, and the laser radar is installed on the front of the vehicle body for measuring the terrain ahead of the vehicle, and the two antennas of the dual antenna GPS positioning system are separated by a certain distance in space; the wheel is connected to the vehicle body through the suspension cylinder, and the displacement sensor and the supporting force sensor are installed on the suspension cylinder for measuring the stroke and supporting force of the suspension cylinder; the steering wheel angle sensor, the throttle opening degree sensor and the braking force sensor are used to measure a steering angle, a throttle opening degree and a braking strength; the electronic control unit respectively communicates with the inertial measurement unit, the laser radar, the dual antenna GPS positioning system, the steering wheel angle sensor, the throttle opening degree sensor, the braking force sensor, and the servo controller group, and the servo controller group communicates with the displacement sensor and supporting force sensor of the suspension cylinder.

* * * * *